(12) United States Patent
Ureche et al.

(10) Patent No.: US 8,503,674 B2
(45) Date of Patent: Aug. 6, 2013

(54) CRYPTOGRAPHIC KEY ATTACK MITIGATION

(75) Inventors: Octavian T. Ureche, Renton, WA (US); Innokentiy Basmov, Redmond, WA (US); Grigory B. Lyakhovitskiy, Bothell, WA (US); Stefen Thom, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 281 days.

(21) Appl. No.: 13/097,035

(22) Filed: Apr. 28, 2011

(65) Prior Publication Data

US 2012/0275596 A1 Nov. 1, 2012

(51) Int. Cl.
*H04L 9/00* (2006.01)
(52) U.S. Cl.
USPC .......... 380/47; 380/30; 380/40; 380/52; 380/270; 380/277; 380/284; 713/150; 713/159; 713/168; 713/189; 713/193; 726/2; 726/3; 726/20; 726/22
(58) Field of Classification Search
USPC .... 713/150, 159, 168–169, 189, 193; 380/30, 380/40–47, 52, 270, 255, 262, 272, 277, 380/284, 286; 726/2–3, 9, 20–22
See application file for complete search history.

(56) References Cited

U.S. PATENT DOCUMENTS

| | | | |
|---|---|---|---|
| 5,937,063 A | 8/1999 | Davis | |
| 7,246,098 B1 | 7/2007 | Walmsley | |
| 7,392,415 B2 | 6/2008 | Grawrock et al. | |
| 2005/0129244 A1* | 6/2005 | Catherman et al. | 380/277 |
| 2006/0085630 A1* | 4/2006 | Challener et al. | 713/2 |
| 2008/0148388 A1 | 6/2008 | Wooten et al. | |
| 2008/0152151 A1* | 6/2008 | Pourzandi et al. | 380/286 |
| 2009/0201845 A1* | 8/2009 | Leppisaari et al. | 370/312 |
| 2011/0040961 A1* | 2/2011 | Badaoui-Najjar et al. | 713/2 |
| 2011/0246785 A1* | 10/2011 | Linsley et al. | 713/189 |

OTHER PUBLICATIONS

Türpe, et al., "Attacking the BitLocker Boot Process", Retrieved at <<http://testlab.sit.fraunhofer.de/downloads/Publications/Attacking_the_BitLocker_Boot_Process_Trust2009.pdf>>, in the Proceedings of the 2nd International Conference on Trusted Computing, Jun. 30, 2009, pp. 14.

"Self-Encrypting Drives", Retrieved at <<http://www.hitachigst.com/internal-drives/self-encrypting-drives/>>, Retrieved Date: Feb. 3, 2011, pp. 2.

(Continued)

*Primary Examiner* — Edan Orgad
*Assistant Examiner* — Fahimeh Mohammadi

(57) ABSTRACT

Cryptographic keys and, subsequently, the data they are intended to protect, are safeguarded from unwarranted attacks utilizing various systems and methodologies designed to minimize the time period in which meaningful versions of cryptographic keys exist in accessible memory, and therefore, are vulnerable. Cryptographic keys, and consequently the data they are intended to protect, can alternatively, or also, be protected from attackers utilizing systems and a methodology that employs a removable storage device for providing authentication factors used in the encryption and decryption processing. Cryptographic keys and protected data can alternatively, or also, be protected with a system and methodology that supports data separation on the storage device(s) of a computing device. Cryptographic keys and the data they are intended to protect can alternatively, or also, be protected employing a system and methodology of virtual compartmentalization that effectively segregates key management from protected data.

17 Claims, 18 Drawing Sheets

OTHER PUBLICATIONS

"BitLocker Drive Encryption in Windows 7: Frequently Asked Question", Retrieved at <<http://technet.microsoft.com/en-us/library/ee449438(WS.10).aspx>>, Retrieved Date: Feb. 3, 2011, pp. 34.

Rance, "Full disk encryption isn't quite dead", Retrieved at <<http://www.computeruser.com/articles/full-disk-encryption-isnt-quite-dead.html>>, Jun. 13, 2010, pp. 3.

Oiaga, Marius, "Microsoft Downplays Windows Vista Encryption Cracks", Retrieved at http://news.softpedia.com/ news/Microsoft-Downplays-Windows-Vista-Encryption-Cracks-79541.shtml>>, Feb. 26, 2008, pp. 2.

"Defense-in-Depth vs. BitUnlocker: How to defeat Cold DRAM attacks using BitLocker, Power Options, and Physical Security", Retrieved at <<http://blogs.technet.com/b/staysafe/archive/2008/02/24/defense-in-depth-vs-bitunlocker-how-to-defeat-cold-dram-attacks-using-bitlocker-power-options-and-physical-security.aspx>>, Feb. 24, 2008, pp. 4.

"Best Practices for BitLocker in Windows 7", Retrieved at http://technet.microsoft.com/en-us/library/dd875532 (WS.10).aspx>>, Retrieved Date: Feb. 3, 2011, pp. 5.

"An Introduction to BitLocker", Retrieved at <<http://www.computersplace.com/an-introduction-to-bitlocker/windows-vista>>, Retrieved Date: Feb. 3, 2011, pp. 8.

Halderman, et al., "Lest We Remember: Cold Boot Attacks on Encryption Key", Retrieved at http://citp.princeton.edu/pub/coldboot.pdf>>, Proc. USENIX Security Symposium, Feb. 21, 2008, pp. 1-16.

* cited by examiner

CRYPTOGRAPHIC KEY ATTACK MITIGATION

BACKGROUND

On many computing devices, e.g., computers, laptops, cell phones, etc., cryptographic keys, also referred to herein as authentication keys, are used to protect data stored thereon that the owner and/or authorized user and/or entity of the computing device, collectively referred to herein as owners, does not want attackers, i.e., unauthorized individuals and/or entities that attempt to obtain data from others' computing devices, to be able to access. Cryptographic keys are software keys, i.e., pieces of information, or parameters, which are used to determine the output value of a cryptographic algorithm. A cryptographic algorithm is used to encrypt and decrypt data to be protected on computing devices. Without the proper cryptographic key(s) a cryptographic algorithm will produce no useful result, and thus, attackers can not gain access to protected data on a computing device.

When a computing device is unlocked, i.e., the computing device is operational for user access, the cryptographic keys are generally available in accessible memory. Even if a computing device owner puts their computing device in sleep mode accessible memory still generally contains the cryptographic keys. This is because sleep mode is a low power mode for a computing device that continues to maintain power to the computing device's accessible memory, and thus, maintains the contents thereof. These conditions render computing devices vulnerable to attackers.

If an attacker can retrieve the cryptographic keys used on a computing device then the attacker can use these cryptographic keys to attempt to improperly retrieve protected data stored on the respective computing device. Yet cryptographic keys are also utilized by the computing device to provide authorized individuals and entities, i.e., computing device owner(s), access to stored protected data.

Thus, it is desirable to mitigate, and even eliminate, the ability of an attacker to procure protected data on a computing device through the use of unwarranted access to the respective cryptographic keys, while still maintaining proper user-friendly access. It is further desirable to render attacks on protected data stored on computing devices harder to mount by reducing the ability of an attacker to obtain meaningful versions of the computing device's cryptographic keys.

SUMMARY

This summary is provided to introduce a selection of concepts in a simplified form which are further described below in the Detailed Description. This summary is not intended to identify key or essential features of the claimed subject matter, nor is it intended to be used as an aid in determining the scope of the claimed subject matter.

Embodiments discussed herein include systems and methodology for mitigating and attempting to eliminate unwarranted attacks to confidential data stored upon computing devices.

In embodiments a cryptographic key, also referred to herein as a TPM cryptographic key, is generated utilizing a nonce derived by a TPM (trusted platform module) of the computing device. In embodiments the TPM cryptographic key is used to encrypt other, pre-established, cryptographic keys on the computing device. In embodiments the newly generated TPM cryptographic key and the unencrypted versions of the pre-established cryptographic keys are removed from the computing device prior to the computing device going to sleep so that the only cryptographic key versions that remain upon the computing device during sleep mode are the encrypted pre-established cryptographic keys.

In embodiments, when the computing device awakens from sleep mode the TPM cryptographic key is regenerated, once again utilizing the nonce derived by the TPM of the computing device. In embodiments the TPM cryptographic key is then used to decrypt the encrypted versions of pre-established cryptographic keys to return the computing device to a normal operating mode state.

In other embodiments a cryptographic key, also referred to herein as a TPM-generated cryptographic key, is generated and then used to encrypt other, pre-established, cryptographic keys for the computing device. In aspects of these other embodiments the TPM-generated cryptographic key is then encrypted with a nonce formulated by the TPM of the computing device. In aspects of these other embodiments the unencrypted TPM-generated cryptographic key and the unencrypted versions of the pre-established cryptographic keys are removed from the computing device prior to the computing device going to sleep.

In aspects of these other embodiments, when the computing device awakens from sleep mode the encrypted version of the TPM-generated cryptographic key is decrypted. In aspects of these other embodiments the original, decrypted, TPM-generated cryptographic key is then used to decrypt the encrypted versions of pre-established cryptographic keys to return the computing device to a normal operating mode state.

In embodiments authentication factors that are used to perform a first round of encryption, and subsequent decryption, are obtained from without the computing device as needed when the computing device is to encrypt, and subsequently decrypt, computing device cryptographic keys.

BRIEF DESCRIPTION OF THE DRAWINGS

These and other features will now be described with reference to the drawings of certain embodiments and examples which are intended to illustrate and not to limit, and in which.

DETAILED DESCRIPTION

In the following description, for purposes of explanation, numerous specific details are set forth in order to provide a thorough understanding of embodiments described herein. It will be apparent however to one skilled in the art that the embodiments may be practiced without these specific details. In other instances well-known structures and devices are either simply referenced or shown in block diagram form in order to avoid unnecessary obscuration. Any and all titles used throughout are for ease of explanation only and are not for any limiting use.

Figure 1:
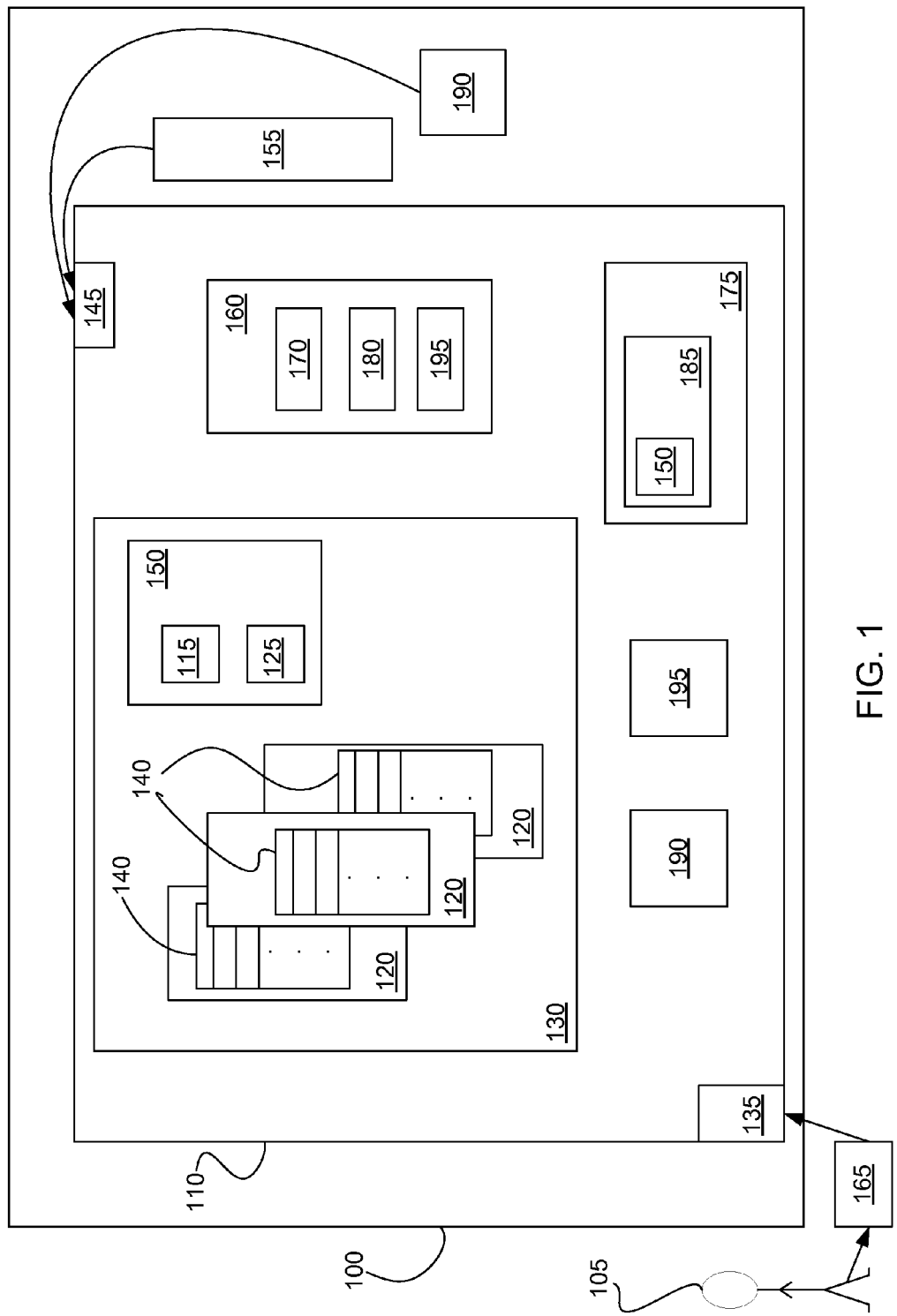
FIG. 1 depicts an embodiment computing system upon which various embodiment cryptographic key mitigation systems and methodologies can be deployed.

Referring to FIG. 1, an embodiment computing system 100 is depicted upon which various embodiment cryptographic key mitigation systems and methodologies can be deployed and/or utilized with. The computing system 100 includes a computing device 110, e.g., a desktop computer, laptop, etc. In the embodiment computing system 100 data 140 is protected, i.e., encrypted, and stored on one or more volumes 120 that collectively make up the accessible memory 130 of the computing device 110. In an embodiment the protected data 140 is decrypted for access by a computing device owner(s) and/or authorized user(s), collectively referred to herein as computing device owner 105, or owner 105, or application(s), using one or more cryptographic keys 150.

An embodiment computing system 100 can include a trusted platform module (TPM) 160. In aspects of this embodiment a TPM 160 is a hardware chip that is maintained on the computing device 110 and implements generation of cryptographic keys 150 and assists in providing limitations to their usage. In aspects of this embodiment a TPM 160 includes a tick counter 170 which is used to, inter alia, generate a nonce 180, i.e., a random, or pseudo-random, generated number.

An embodiment computing device 110 includes one or more drivers 195, i.e., software code that when executed performs a predefined function(s), also referred to herein as procedures or applications, for implementing one or more cryptographic key mitigation strategies as further described herein. In some embodiments the driver, or drivers, 195 collectively referred to herein as driver 195, for implementing a cryptographic key mitigation strategy is installed upon the computing device 110 but exterior to the TPM 160. In other embodiments the driver 195 for implementing a cryptographic key mitigation strategy is installed within the TPM 160 of the computing device 110.

An embodiment computing system 100 can include one or more edrives 190 that are installed within the computing device 110 and/or are connected thereto. In an embodiment an edrive 190 is similar to a hard drive except that an edrive 190 includes an internal implementation for the encryption and decryption of data 140. In embodiments edrives 190, like hard drives, store data 140 for their respective computing system 100.

In an embodiment the edrive(s) 190 of the computing system 100 can contain accessible memory for a computing device 130. In an embodiment a computing device's accessible memory 130 can also, or alternatively, include RAM, other hard drive(s) installed within and/or connected to the computing device 110, etc. In some embodiments discussed herein any edrive 190 of a computing system 100 is not considered to be accessible memory 130 for the respective computing device 110, and thus, for example, removal of encrypted cryptographic keys 150 from accessible memory 130 and subsequent storage thereof on an edrive 190, as described herein below, discusses storage on an edrive 190 rather than in RAM or other non edrive hard drives.

In an embodiment data 140 on an edrive 190 is protected by bands, i.e., data encrypted regions in the edrive 190, and each band has its own encryption key, also referred to herein as a band key, e.g., a full volume encryption key (FVEK) 115, a band authentication key, also referred to herein as a band PIN, etc. In an embodiment once a band is unlocked, or otherwise decrypted, by its band key the band stays unlocked and the data 140 the band is protecting is available for read/write operations until the band is once again locked by either an explicit command or by a power cycle to the edrive 190 and/or computing system 100.

In an embodiment a computing system 100 includes a volume master key (VMK) 125. In aspects of this embodiment data 140 stored on a volume 120 or within a band of an edrive 190 is encrypted using a FVEK 115, or other band key, and is further encrypted with the VMK 125 for the computing system 100.

An embodiment computing system 100 includes one or more user interfaces (UIs) 135 for communication between an owner 105 and the computing device 110. Embodiment UIs 135 include, but are not limited to, screen displays, touch screen buttons, keyboard, mouse, etc.

An embodiment computing device 110 includes one or more ports 145 for the insertion, or inclusion, of devices to the computing device 110, and thus, the computing system 100, including, but not limited to, USB drives 155, also referred to herein as USBs 155, external edrives 190, etc.

Figure 2:
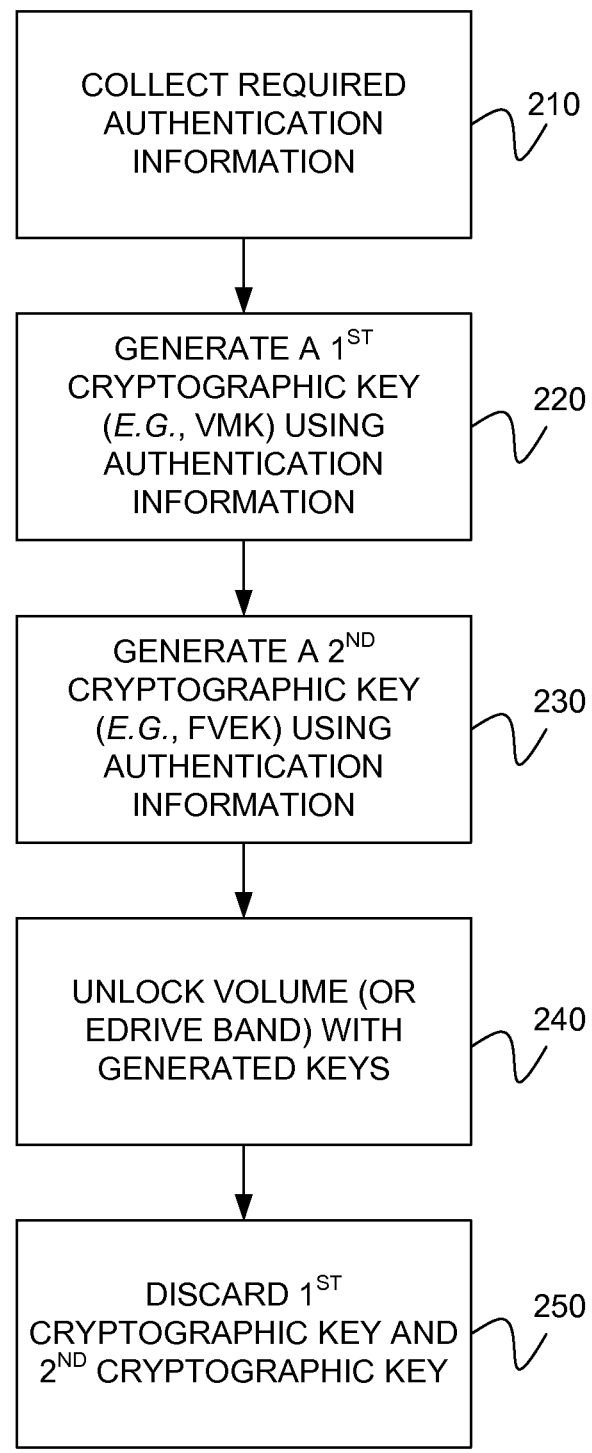
FIG. 2 depicts a first embodiment logic flow illustrating a user input based methodology for minimizing the time period during which cryptographic keys are maintained in accessible memory.

Referring to FIG. 2, a first embodiment logic flow illustrates a user input (UI) based methodology for minimizing the time period during which cryptographic key(s) 150 are maintained in accessible memory 130, e.g., volumes 120. Cryptographic keys 150 that are stored in accessible memory 130 of a computing system 100 can be obtained by attackers, which provides the attackers the ability to then access protected data 140.

In an embodiment authentication information 165 is input by a user to the computing device 110 to derive one or more cryptographic keys 150. In an embodiment authentication information 165 can include, but is not limited to, one or more numbers, one or more passwords, one or more keystrokes, personal information, e.g., a name, a personal identification number, height of an owner 105, city of residence of an owner 105, etc., etc. In an embodiment authentication information 165 is requested to be input by an owner 105 from a display screen UI 135 of the computing device 110. In an embodiment authentication information 165 is input via a user interface 135, e.g., keyboard, touch screen, etc., and/or a device, e.g., USB 155, installed to a port 145 of the computing device 110.

The embodiment of FIG. 2 can render it more difficult for an attacker to extract cryptographic keys 150, e.g., the VMK 125, the FVEK 115, the band pin, etc., from accessible memory, e.g., volumes 120, of a computing system 100 that the attacker has physical access to. Increasing the difficulty of an attack has the advantage of dissuading various classes of attackers who either do not possess the ability and/or the time to attempt to mount an offense again the implemented cryptographic key protections.

While the following discussion is made with respect to systems portrayed herein the operations described may be implemented in other systems. The operations described herein are not limited to the order shown. Additionally, in other alternative embodiments more or fewer operations may be performed.

Referring to FIG. 2, authentication information for deriving one or more cryptographic keys is collected 210, e.g., requested from an owner and thereafter input to the computing device. In an embodiment a first cryptographic key, e.g., the VMK, for the computing device is generated utilizing inputted authentication information and/or data derived there from 220. In an aspect of this embodiment the generated first cryptographic key 150 is contained within the computing device's accessible memory 130.

In an embodiment a second cryptographic key, e.g., a FVEK for a volume, a band pin for an edrive band, etc., is generated utilizing inputted authentication information and/ or data derived there from 230. In an aspect of this embodiment the generated second cryptographic key 150 is contained within the computing device's accessible memory 130.

In an embodiment the volume or edrive band whose protected data is to be accessed is unlocked, i.e., decrypted, utilizing the first cryptographic key and the second cryptographic key 240. In an embodiment both the first cryptographic key and the second cryptographic key are discarded, i.e., deleted from the computing device's accessible memory, once the respective volume or edrive band is unlocked 250.

In an embodiment once the steps of the methodology of FIG. 2 are enacted the volume 120, or edrive band, is available for normal operation and the respective cryptographic keys 150 utilized to unlock the data 140 are no longer present in accessible memory 130, and thus are unavailable to an attacker.

In embodiments the logic flow steps 210, 220, 230 and 250 of FIG. 2 can be performed to, e.g., lock a volume 120 or band on an edrive 190, i.e., encrypt the data 140 stored thereon, shrink a volume 120, extend a volume 120, permanently unlock a volume 120 or band on an edrive 190, and re-unlock a volume 120 that is non-pivotal for operating system (OS) operations subsequent to the computing device 110 resuming from a power state that caused a volume power reset, i.e., sleep mode.

Figure 3A:
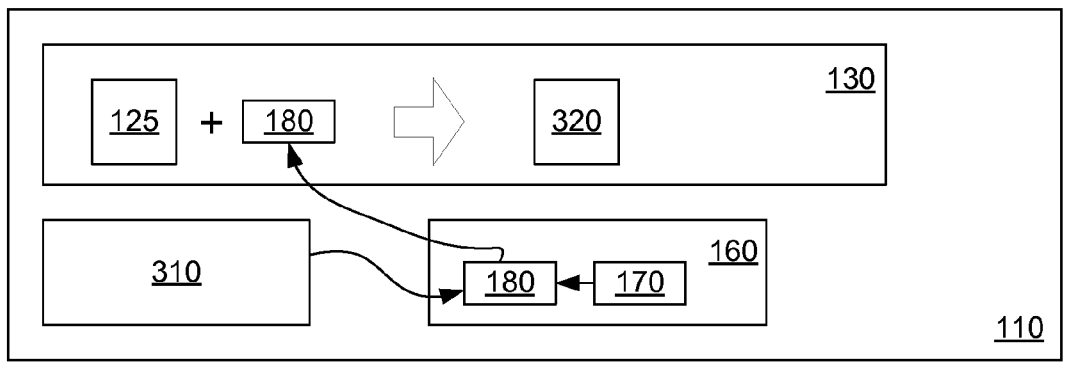
FIGS. 3A-3D depict a computing device and scenario employing a second embodiment, TPM-based, methodology for protecting data and cryptographic keys from unauthorized attacks.

FIGS. 3A-3D depict a computing device 110 and scenario employing a second embodiment methodology for protecting data 140 and cryptographic keys 150 from unauthorized attacks. Referring to FIG. 3A, in this second embodiment when a computing device 110 is about to go to sleep, a driver 195 for implementing a cryptographic key mitigation strategy executes on the computing device 110. In an aspect of this embodiment the driver 195 is a full volume encryption driver 310, also referred to as a FVEdriver 310, which, when executing on the computing device 110, reads the current nonce 180 generated within the TPM 160, i.e., the TPM nonce 180. In aspects of this embodiment the TPM nonce 180 is a random, or pseudo-random, number generated in the context of the TPM tick counter 170. In aspects of this embodiment the TPM nonce 180 is a twenty-byte number.

In an aspect of this embodiment the TPM nonce 180 is generated each time the TPM 160 is powered up and initialized. In this aspect of this embodiment, if and when the TPM 160 loses power, it loses the current TPM nonce 180, which cannot thereafter be recovered.

In this second embodiment the FVEdriver 310 encrypts the VMK 125 with the TPM nonce 180, generating an encrypted VMK 320.

Figure 3B:
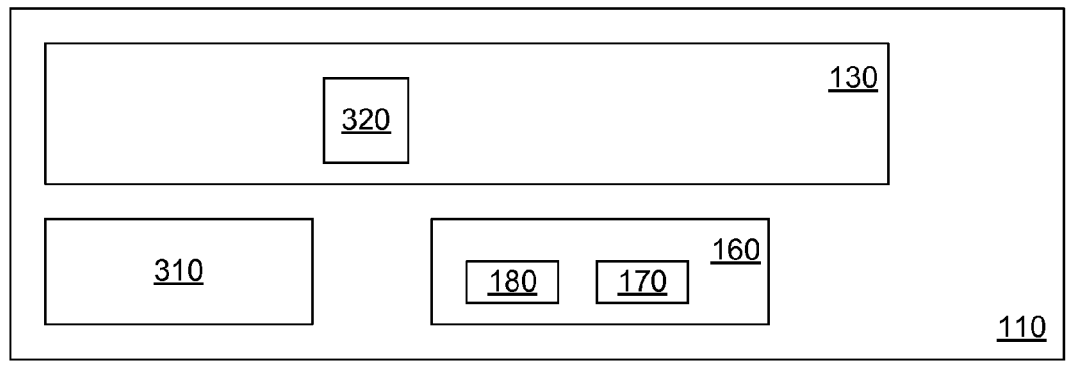

Referring to FIG. 3B, in an aspect of this second embodiment the encryption of the VMK 125 results in the unencrypted VMK 125 being deleted, or otherwise erased or removed, from accessible memory 130. In an alternative aspect of this second embodiment, subsequent to encrypting the VMK 125, the FVEdriver 310 deletes the VMK 125 from accessible memory 130.

In an aspect of this second embodiment the encrypted VMK 320 is stored within the computing device's accessible memory 130.

In this second embodiment, subsequent to encrypting the VMK 125, the FVEdriver 310 deletes the TPM nonce 180 from accessible memory 130.

In this second embodiment the computing device 110 is now able to be put in sleep mode.

In this second embodiment, once the computing device 110 is asleep the TPM 160 is inaccessible to anyone and any entity and the VMK 125 is encrypted. At this time, as only the encrypted version VMK 125, i.e., the encrypted VMK 320, is in accessible memory 130, a would-be attacker has no access to a usable cryptographic key 150 and no one, including the attacker, can access the TPM 160 until the computing device 110 is awakened from its sleep mode.

Figure 3C:
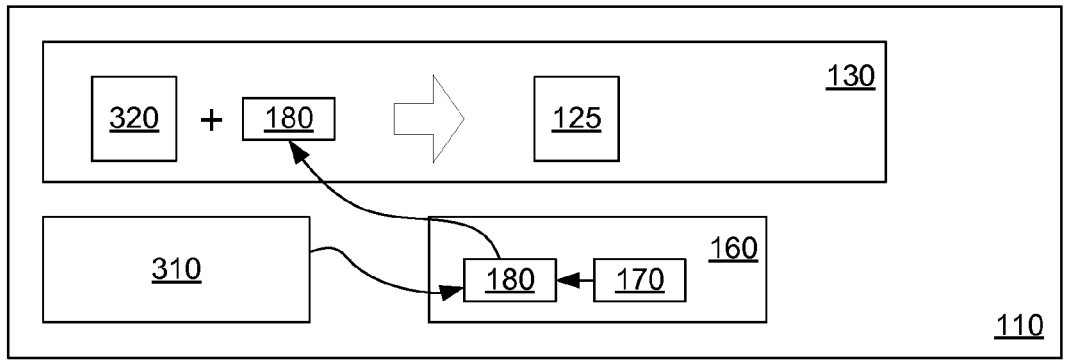

Referring to FIG. 3C, once the computing device 110 resumes, i.e., awakens, from sleep mode and the current user 105 is properly authenticated, in this second embodiment the FVEdriver 310 once more reads the TMP nonce 180 from the TPM 160. If there has been no power reset to the computing system 100 and the TPM 160 since the computing device 110 went to sleep then the TPM nonce 180 that the FVEdriver 310 reads now will be the same TPM nonce 180 that the FVEdriver 310 read prior to the computing device 110 going to sleep.

In this second embodiment, the FVEdriver 310 uses the TPM nonce 180 to decrypt the encrypted VMK 320. If the TPM nonce 180 is the same value that was used to previously encrypt the VMK 125 then the decryption will be successful and the valid VMK 125 will be recovered. In this second embodiment, if the TPM nonce 180 is not the same value that was used to previously encrypt the VMK 125 because, inter alia, an attacker rebooted the computing system 100 in an attempt to obtain access to protected data 140, which caused the TPM 160 to generate a new nonce 180, then the decryption will fail to result in a valid VMK 125 that can be used to unlock protected data 140.

Figure 3D:
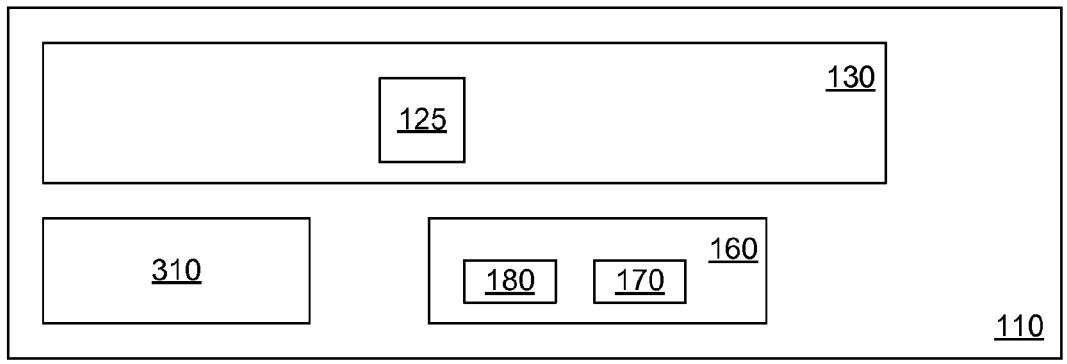

Referring to FIG. 3D, in an aspect of this second embodiment, as part of the decryption process of the encrypted VMK 320, the encrypted VMK 320 is deleted, or otherwise erased or removed, from accessible memory 130. In an alternative aspect of this second embodiment, subsequent to decrypting the encrypted VMK 320, the FVEdriver 310 deletes the encrypted VMK 320 from accessible memory 130.

In this second embodiment, if the decryption of the encrypted VMK 320 is successful the valid unencrypted VMK 125 will be recovered and restored, i.e., resaved, to accessible memory 130.

In this second embodiment, subsequent to decrypting the encrypted VMK 320, the FVEdriver 310 deletes the TPM nonce 180 from accessible memory 130.

At this time the computing device 110 has been successfully restored from its sleep mode and the computing device's cryptographic key, VMK 125, is now available for use in accessible memory 130.

Figure 4A:
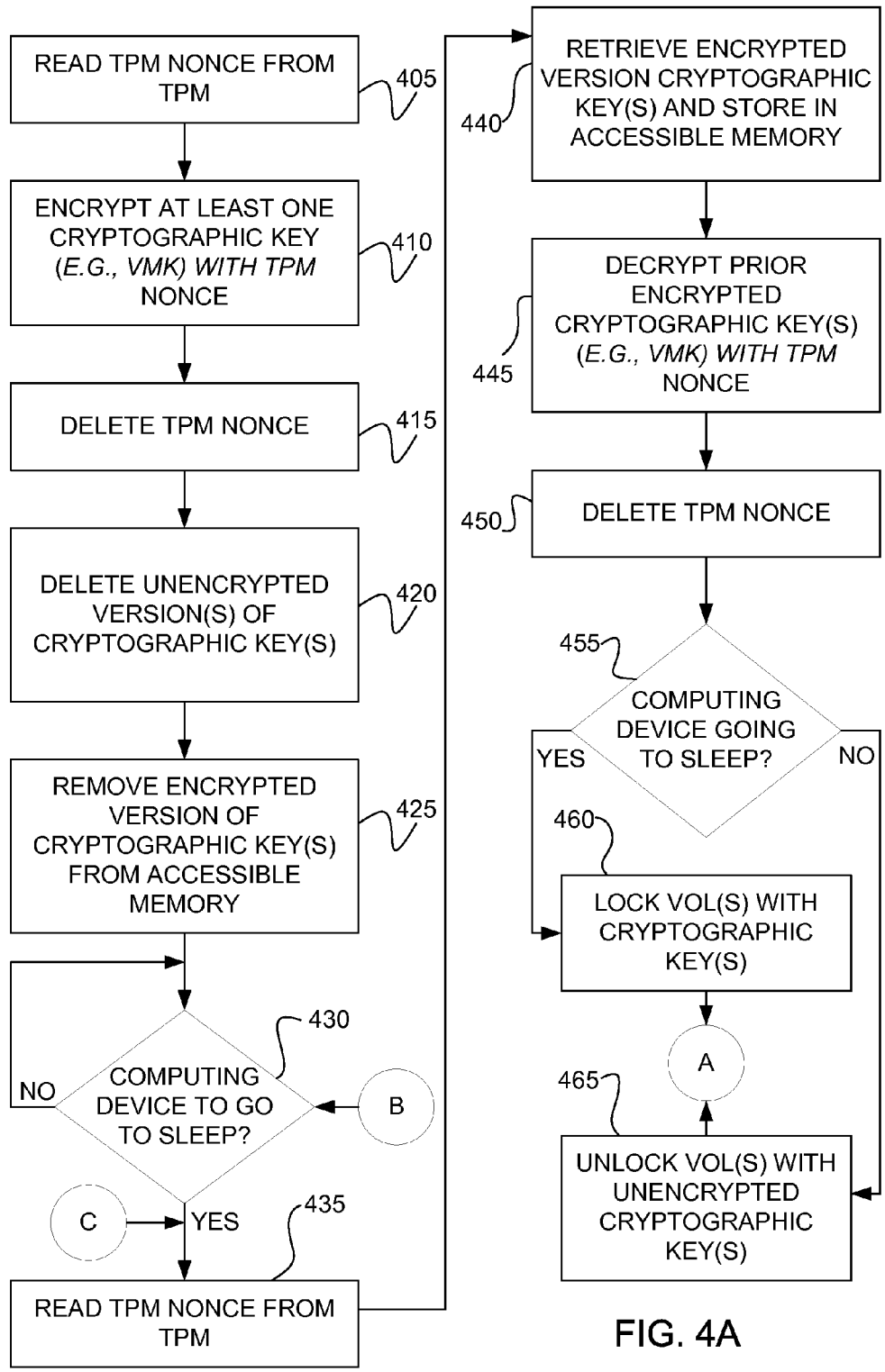
FIGS. 4A-4B depict a second embodiment logic flow for a TPM-based methodology for minimizing the time period during which cryptographic keys are maintained in accessible memory.
Figure 4B:
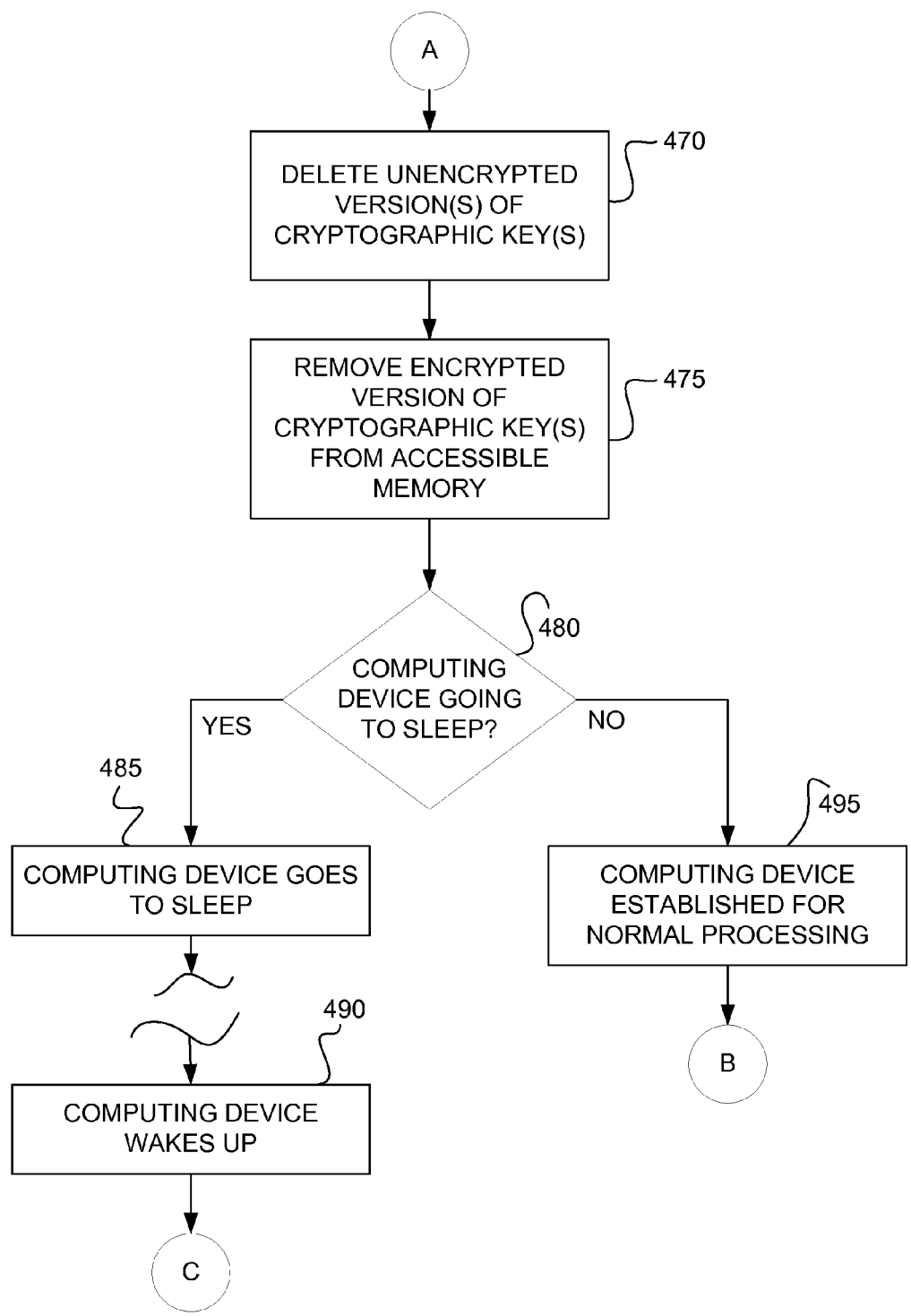

Referring to FIGS. 4A-4B, a second embodiment logic flow illustrates a TPM-based, also referred to herein as TPM-centric, methodology for minimizing the time period during which cryptographic key(s) 150 are maintained in accessible memory 130. As previously noted, cryptographic keys 150 residing in accessible memory 130 of a computing device 110 can be obtained by attackers and this access can provide attackers the ability to breach protected data 140.

The second embodiment depicted in FIGS. 3A-3D and FIGS. 4A-4B protects data 140 from an attack by affecting an attacker's ability to gain access to the protected data 140 while a vulnerable computing device 110 is asleep through the use of a TPM nonce encrypted cryptographic key(s).

While the following discussion is made with respect to systems portrayed herein the operations described may be implemented in other systems. The operations described herein are not limited to the order shown. Additionally, in other alternative embodiments more or fewer operations may be performed.

Referring to FIG. 4A, in a second embodiment at some, initial, encryption establishment time, also referred to herein as setup time, a driver, i.e., a piece of software code executing on the computing device, e.g., a Full Volume Encryption driver (FVEdriver), reads the TPM nonce from the TPM 405. In this second embodiment the driver encrypts at least one cryptographic key currently in existence for the computing system, e.g., the computing system's VMK, with the TPM nonce 410. In this second embodiment the TPM nonce is then deleted from any memory locations in the computing device where it is currently stored, i.e., accessible memory, other than the TPM itself 415.

In an aspect of this second embodiment once the computing system's cryptographic key(s), e.g., the VMK, is encrypted, only the encrypted version cryptographic key(s) remains within the computing device, with no trace of the unencrypted version(s) of the cryptographic key(s) therein 420. In an alternative aspect of this second embodiment the original, decrypted version(s) of the cryptographic key(s) is deleted, or otherwise erased or removed, from the computing device subsequent to its encryption 420.

In an aspect of this second embodiment the encrypted version(s) of the cryptographic key(s) is stored other than in accessible memory of a volume, e.g., on an edrive, etc., and the encrypted version(s) of the cryptographic key(s) is deleted, or otherwise erased or removed, from accessible memory 425.

At this time encryption has been established, i.e., setup.

At decision block 430 a determination is made as to whether the computing device is to go into sleep mode. If no, normal processing continues.

If however the computing device is to go into sleep mode in this second embodiment the driver reads, or otherwise retrieves, the TPM nonce from the TPM 435. In an aspect of this second embodiment the encrypted version(s) of the cryptographic key(s) is retrieved from the non-accessible memory storage, e.g., the edrive, etc., it is currently stored on, if only currently stored thereon, and copied to accessible memory, e.g., RAM, etc., 440. In this second embodiment the driver decrypts all prior encrypted cryptographic keys, e.g., the prior encrypted VMK, with the TPM nonce 445. In this second embodiment the TPM nonce is then deleted from any memory locations in the computing device where it is currently stored, i.e., accessible memory, other than the TPM itself 450.

In this second embodiment at decision block 455 a determination is made as to whether the computing device is going into sleep mode. If yes, in this second embodiment one or more volumes of data are locked with one or more unencrypted version cryptographic keys, e.g., the VMK, 460. Referring to FIG. 4B, in this second embodiment once the respective volumes of data are locked the unencrypted, i.e., original, decrypted, cryptographic key(s) is deleted, or otherwise erased or removed, from the computing device 470.

In an aspect of this second embodiment the encrypted version(s) of the cryptographic key(s) is deleted, or otherwise erased or removed, from accessible memory 475. In an aspect of this second embodiment the encrypted version(s) of the cryptographic key(s) remains stored in other than accessible memory of a volume, e.g., on the edrive, etc., where it was stored when initially encrypted.

In this second embodiment at decision block 480 if the computing device is going to sleep then the computing device can now go to sleep 485.

Thereafter the computing device awakens from sleep mode 490. Referring back to FIG. 4A, in this second embodiment the driver retrieves the TPM nonce from the TPM 435. In an aspect of this second embodiment the encrypted version(s) of the cryptographic key(s) is retrieved from the non-accessible memory storage it is currently stored on if only currently stored thereon and copied to accessible memory 440. In this second embodiment the driver decrypts all prior encrypted cryptographic keys, e.g., the prior encrypted VMK, with the TPM nonce 445. In this second embodiment the TPM nonce is then deleted from any memory locations in the computing device where it is currently stored other than the TPM itself 450.

In this second embodiment at decision block 455 if it is determined that the computing device is not going into sleep mode, i.e., it is awakening, then one or more locked volumes of data are unlocked with the now unencrypted cryptographic key(s) 465.

Referring again to FIG. 4B, in this second embodiment, once the respective volumes of data are unlocked the unencrypted, i.e., original, decrypted, cryptographic key(s) is deleted, or otherwise erased or removed, from the computing device 470.

In an aspect of this second embodiment the encrypted version(s) of the cryptographic key(s) is deleted, or otherwise erased or removed, from accessible memory 475. In an aspect of this second embodiment the encrypted version(s) of the cryptographic key(s) remains stored in other than accessible memory of a volume, e.g., on the edrive, etc., where it was stored when initially encrypted.

In this second embodiment at decision block 480 if the computing device is not going to sleep, i.e., it is awakening, then at this time the computing device has been successfully restored from sleep mode and is established for normal processing 495.

In an aspect of this second embodiment, once encrypted versions of the cryptographic key(s) 150 for a computing device 110 are generated and stored they need not be regenerated each time the computing device 110 subsequently goes to sleep. In this aspect of this second embodiment encrypted versions of the cryptographic keys 150 remain where stored when the computing device 110 is in sleep mode. In an aspect of this second embodiment, when the computing device 110 subsequently reawakens the encrypted version(s) of the cryptographic key(s) 150 is retrieved from its storage location, e.g., on an edrive 190, and located in accessible memory 130 in order for its decryption to be effected.

Figure 5A:
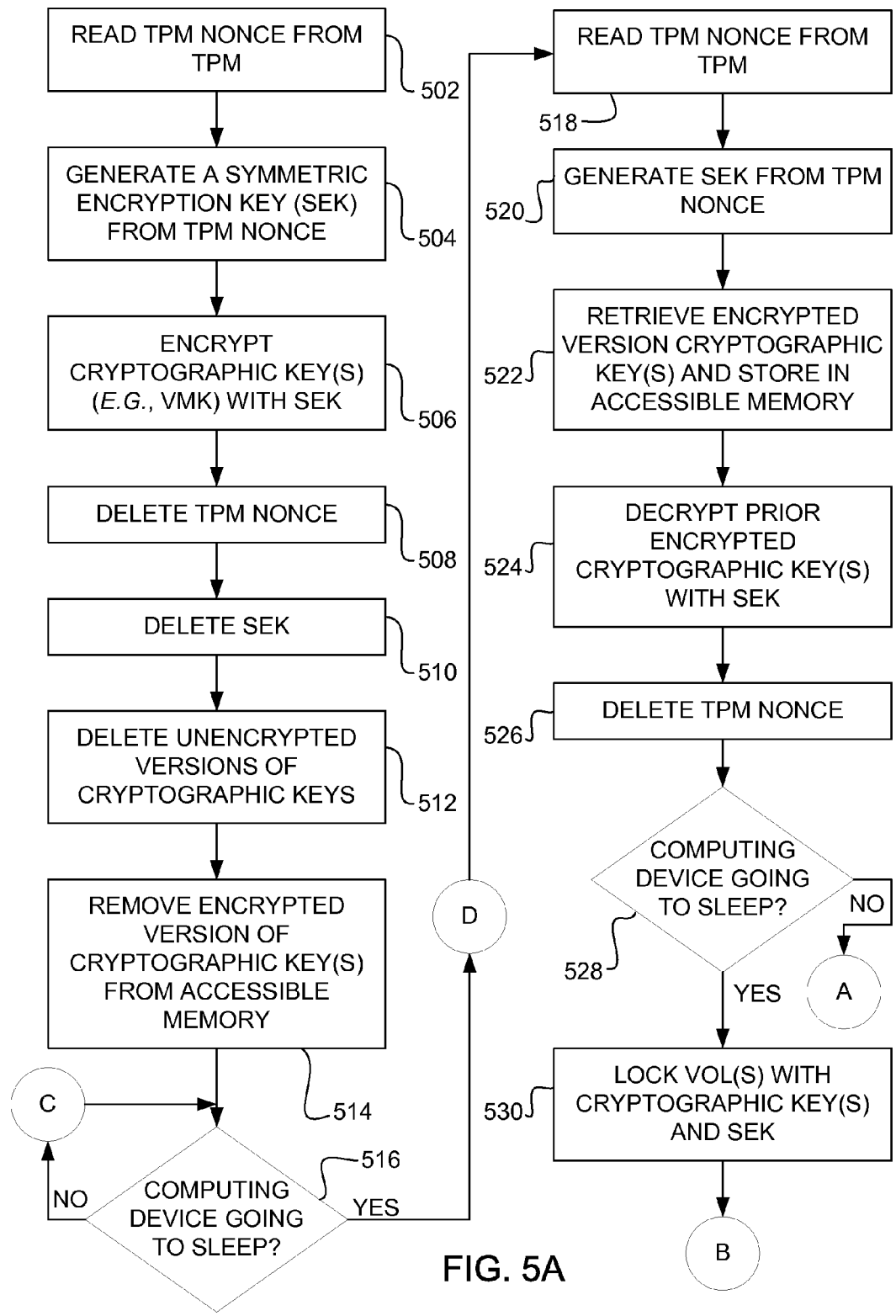
FIGS. 5A-5B depict a third embodiment logic flow for an enhanced TPM-based methodology for minimizing the time period during which cryptographic keys are maintained in accessible memory utilizing a strengthened key encryption scheme.
Figure 5B:
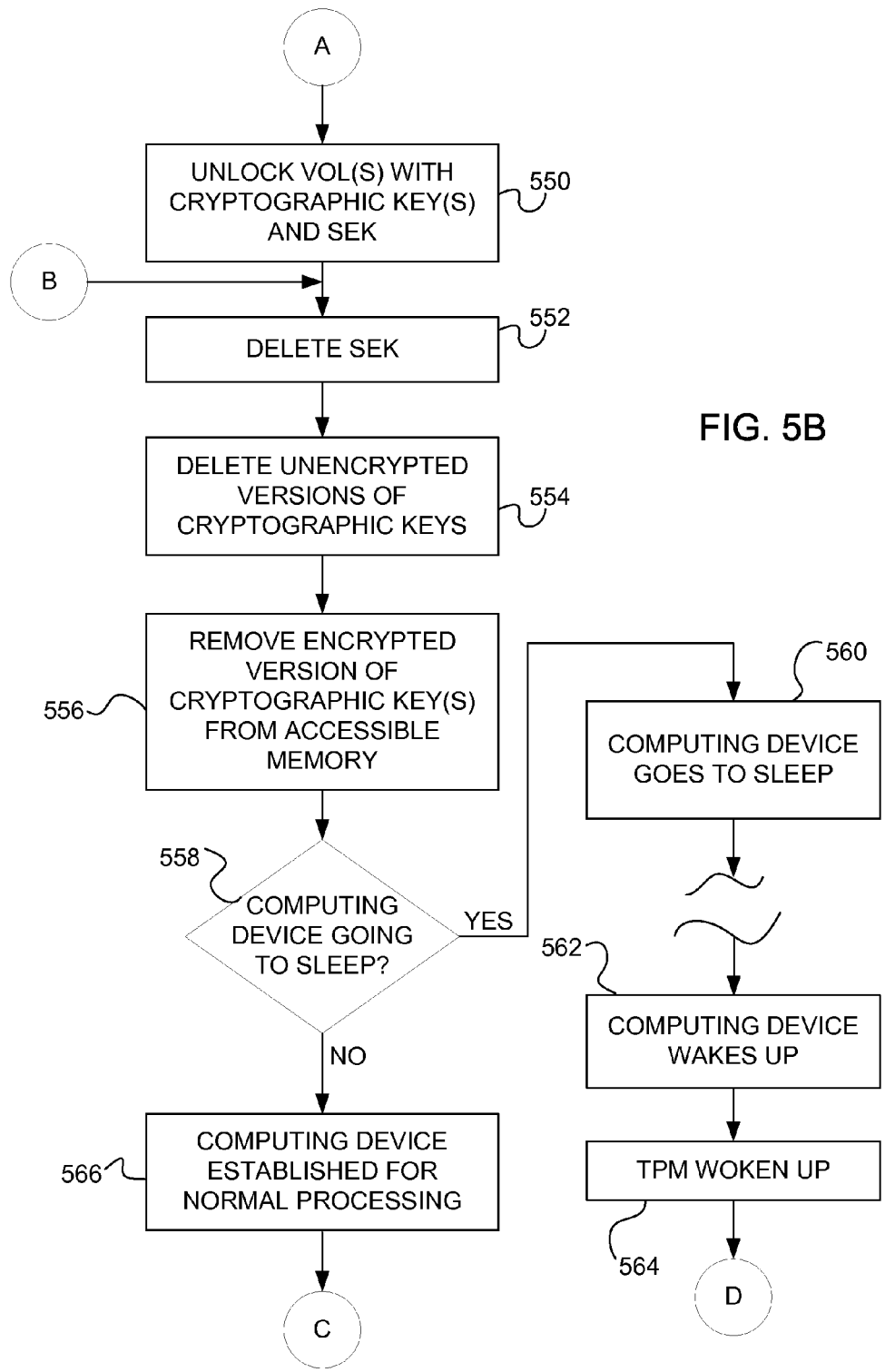

Referring to FIGS. 5A-5B, a third embodiment logic flow illustrates an enhanced TPM-based, also referred to herein as TPM-centric, methodology for minimizing the time period during which cryptographic key(s) are maintained in accessible memory 130 utilizing a strengthened key encryption scheme.

While the following discussion is made with respect to systems portrayed herein the operations described may be implemented in other systems. The operations described herein are not limited to the order shown. Additionally, in other alternative embodiments more or fewer operations may be performed.

Referring to FIG. 5A, in a third embodiment at some, initial, encryption establishment time, also referred to herein as setup time, a driver, e.g., a Full Volume Encryption driver (FVEdriver), reads the TPM nonce from the TPM 502. In this third embodiment the driver generates a cryptographic key, e.g., a symmetric encryption key (SEK), using the TPM nonce 504. In an aspect of this third embodiment the driver encrypts at least one cryptographic key in existence for the computing system, e.g., the VMK, with the SEK 506. In an alternative aspect of this third embodiment the driver encrypts all the cryptographic keys currently in existence for the computing system with the SEK 506.

In this third embodiment the TPM nonce is deleted from any memory locations in the computing device where it is currently stored other than the TPM itself 508.

In this third embodiment the generated SEK is deleted from the computing device 510.

In an aspect of this third embodiment once the computing system's cryptographic key(s), e.g., the VMK, is encrypted, only the encrypted version cryptographic key(s) remains within the computing device, with no trace of the unencrypted version(s) of the cryptographic key(s) therein 512.

In an alternative aspect of this third embodiment the original, decrypted version(s) of the computing system's cryptographic key(s) is deleted, or otherwise erased or removed, from the computing device subsequent to its encryption 512.

In an aspect of this third embodiment the encrypted version(s) of the cryptographic key(s) is stored other than in accessible memory of a volume, e.g., on an edrive, etc., and the encrypted version(s) of the cryptographic key(s) is deleted, or otherwise erased or removed, from accessible memory 514.

At this time encryption has been established, i.e., setup.

At decision block 516 a determination is made as to whether the computing device is to go into sleep mode. If no, normal processing continues.

If however the computing device is to go into sleep mode in this third embodiment the driver reads, or otherwise retrieves, the TPM nonce from the TPM 518. In this third embodiment the driver generates a cryptographic key, e.g., a symmetric encryption key (SEK), using the TPM nonce 520.

In an aspect of this third embodiment the encrypted version(s) of the computing system's cryptographic key(s) is retrieved from the non-accessible memory storage, e.g., the edrive, etc., it is currently stored on, if only currently stored thereon, and copied to accessible memory, e.g., RAM, etc., 522. In this third embodiment the driver decrypts all prior encrypted computing system cryptographic keys, e.g., the prior encrypted VMK, with the generated cryptographic key, e.g., the generated SEK, 524.

In this third embodiment the TPM nonce is then deleted from any memory locations in the computing device where it is currently stored, i.e., accessible memory, other than the TPM itself 526.

In this third embodiment at decision block 528 a determination is made as to whether the computing device is going into sleep mode. If yes, in an aspect of this third embodiment one or more volumes of data are locked with one or more unencrypted version computing system cryptographic keys, e.g., the VMK, 530. In an alternative aspect of this third embodiment one or more volumes of data are locked with one or more unencrypted version computing system cryptographic keys and the generated SEK 530.

Referring to FIG. 5B, in this third embodiment the generated SEK is deleted from the computing device 552. In this third embodiment once the respective volumes of data are locked the unencrypted, i.e., original, decrypted, computing system cryptographic key(s) is deleted, or otherwise erased or removed, from the computing device 554.

In an aspect of this third embodiment the encrypted version(s) of the computing system's cryptographic key(s), e.g., the encrypted version VMK, is deleted, or otherwise erased or removed, from accessible memory 556. In an aspect of this third embodiment the encrypted version(s) of the computing system's cryptographic key(s) remains stored in other than accessible memory of a volume, e.g., on the edrive, etc., where it was stored when initially encrypted.

In this third embodiment at decision block 558 if the computing device is going to sleep then the computing device can now go to sleep 560.

Thereafter the computing device awakens from sleep mode 562. In this third embodiment the TPM is woken up 564. Referring back to FIG. 5A, in this third embodiment the driver retrieves the TPM nonce from the TPM 518. In this third embodiment the driver generates a cryptographic key, e.g., a symmetric encryption key (SEK), using the TPM nonce 520.

In an aspect of this third embodiment the encrypted version(s) of the computing system's cryptographic key(s) is retrieved from the non-accessible memory storage it is currently stored on, if only currently stored thereon, and copied to accessible memory 522. In this third embodiment the driver decrypts all prior encrypted computing system cryptographic keys, e.g., the prior encrypted VMK, with the generated cryptographic key, e.g., the generated SEK, 524.

In this third embodiment the TPM nonce is then deleted from any memory locations in the computing device where it is currently stored, i.e., accessible memory, other than the TPM itself 526.

In this third embodiment at decision block 528 a determination is made as to whether the computing device is going into sleep mode. If no, i.e., the computing device is awakening, then referring to FIG. 5B again in an aspect of this third embodiment one or more volumes of data are unlocked with one or more unencrypted version computing system cryptographic keys, e.g., the VMK, 550. In an alternative aspect of this third embodiment one or more volumes of data are unlocked with one or more unencrypted version computing system cryptographic keys and the generated SEK 550.

In this third embodiment the generated SEK is deleted from the computing device 552. In this third embodiment once the respective volumes of data are unlocked the unencrypted, i.e., original, decrypted, computing system cryptographic key(s) is deleted, or otherwise erased or removed, from the computing device 554.

In an aspect of this third embodiment the encrypted version(s) of the computing system's cryptographic key(s), e.g., the encrypted version VMK, is deleted, or otherwise erased or removed, from accessible memory 556. In an aspect of this third embodiment the encrypted version(s) of the computing system's cryptographic key(s) remains stored in other than accessible memory of a volume, e.g., on the edrive, etc., where it was stored when initially encrypted.

In this third embodiment at decision block 558 if the computing device is not going to sleep, i.e., it is awakening, then at this time the computing device has been successfully restored from sleep mode and is established for normal processing 566.

In an aspect of this third embodiment, once encrypted versions of the computing system's cryptographic key(s) 150 are generated and stored they need not be regenerated each time the computing device 110 subsequently goes to sleep. In this aspect of this third embodiment encrypted versions of the computing system's cryptographic keys 150 remain where stored when the computing device 110 is in sleep mode. In an aspect of this third embodiment, when the computing device 110 subsequently reawakens the encrypted version(s) of the computing system's cryptographic key(s) 150 is retrieved from its storage location, e.g., on an edrive 190, and located in accessible memory 130 in order for its decryption to be effected.

Figure 6A:
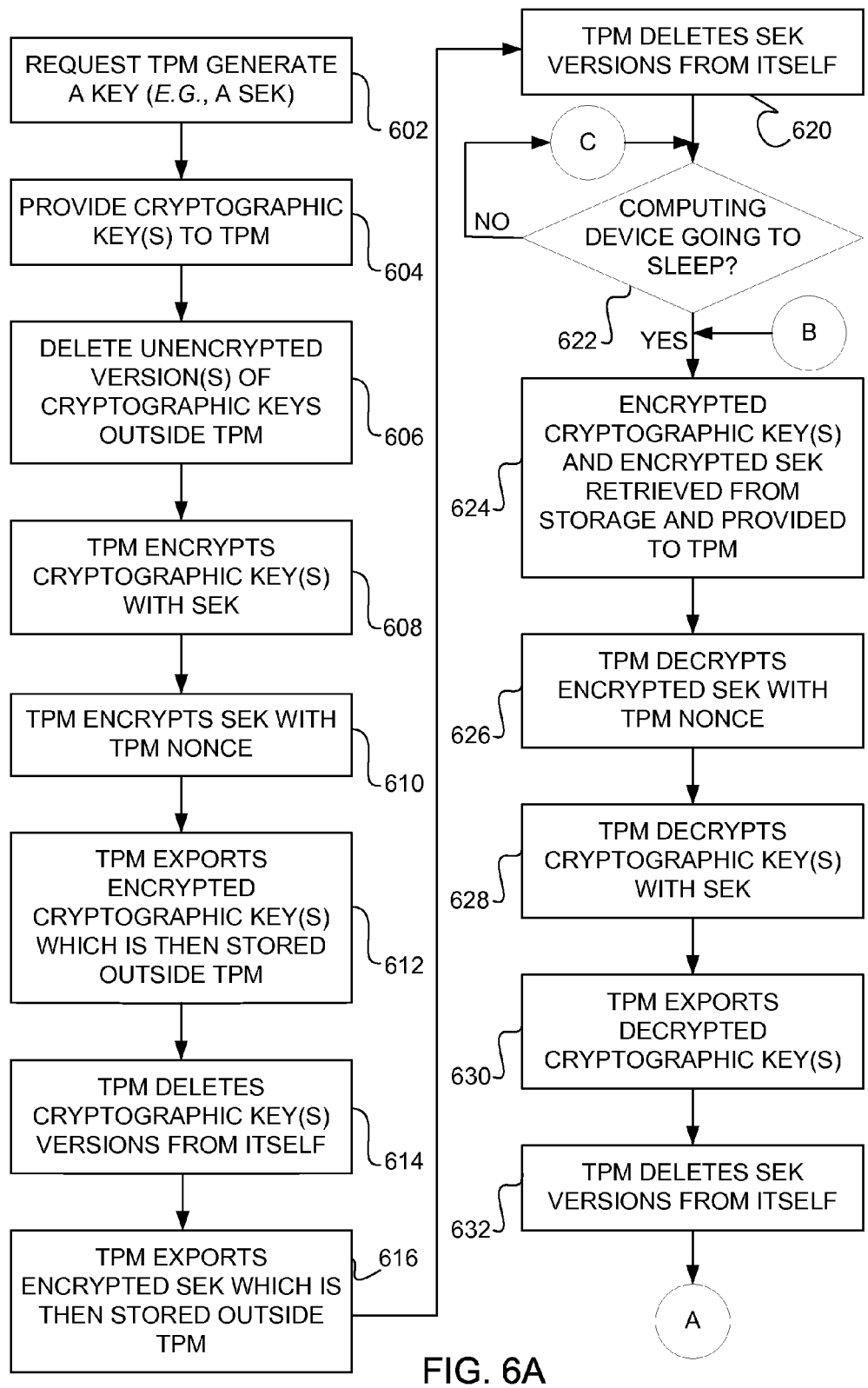
FIGS. 6A-6B depict a fourth embodiment logic flow for a TPM centric methodology for minimizing the time period during which meaningful versions of cryptographic keys are maintained in accessible memory utilizing TPM key generation and a strengthened key encryption scheme.
Figure 6B:
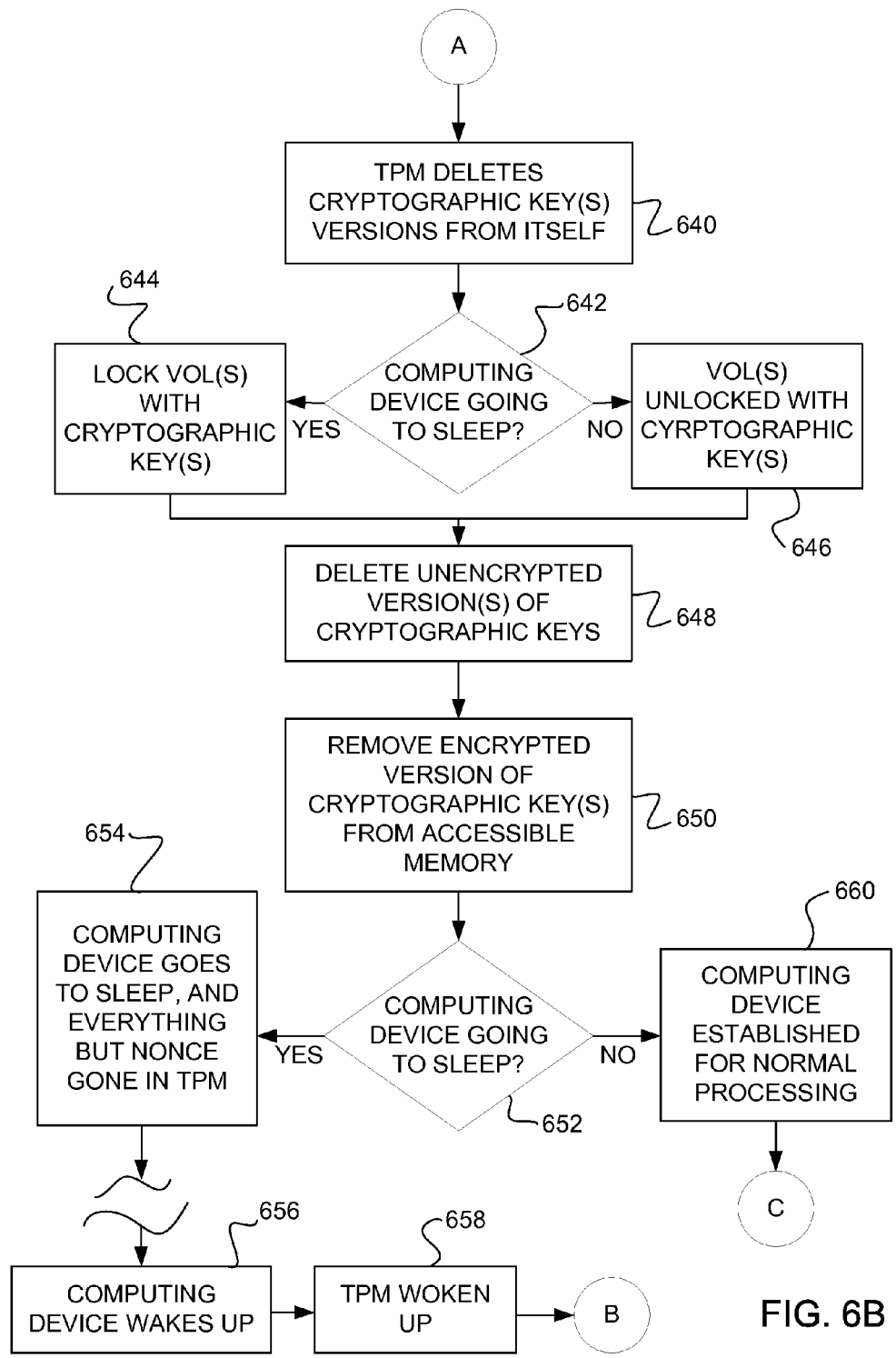

Referring to FIGS. 6A-6B, a fourth embodiment logic flow illustrates an TPM-centric based methodology for minimizing the time period during which meaningful versions of cryptographic key(s) are maintained in accessible memory 130 utilizing TPM key generation and a strengthened key encryption scheme.

While the following discussion is made with respect to systems portrayed herein the operations described may be implemented in other systems. The operations described herein are not limited to the order shown. Additionally, in other alternative embodiments more or fewer operations may be performed.

Referring to FIG. 6A, in a fourth embodiment, at a time prior to the computing device being put in sleep mode, the TPM is requested to generate a cryptographic key, e.g., a symmetric encryption key (SEK), also referred to herein as a key, 602.

In this fourth embodiment a driver, e.g., a Full Volume Encryption driver (FVEdriver) provides one or more currently existing computing system cryptographic keys to the TPM 604. In this fourth embodiment the decrypted version computing system cryptographic keys that have been provided to the TPM are deleted from any current storage location without the TPM 606.

In this fourth embodiment the TPM encrypts the computing system cryptographic keys it has been provided with the generated key, e.g., the SEK, 608.

In this fourth embodiment the TPM encrypts the generated key, e.g., the SEK, with the TPM nonce 610.

In this fourth embodiment the TPM exports the encrypted version computing system cryptographic key(s) from the TPM and the accepting driver stores it outside the TPM 612. In an aspect of this fourth embodiment the encrypted version cryptographic key(s) is stored other than in accessible memory of a volume, e.g., on an edrive, etc., and the encrypted version(s) of the cryptographic key(s) is deleted, or otherwise erased or removed, from accessible memory 612.

In this fourth embodiment the TPM thereafter deletes all computing system cryptographic key versions, unencrypted and encrypted, from itself 614.

In this fourth embodiment the TPM exports the encrypted generated key, also referred to herein as the encrypted SEK, from the TPM and the accepting driver stores it outside the TPM 616. In an aspect of this fourth embodiment the encrypted SEK is stored other than in accessible memory of a volume, e.g., on an edrive, etc., and the encrypted SEK is deleted, or otherwise erased or removed, from accessible memory 616.

In this fourth embodiment the TPM thereafter deletes all generated key, e.g., SEK, versions, unencrypted and encrypted, from itself 620.

In this fourth embodiment once the computing system's cryptographic key(s) is encrypted only the encrypted version cryptographic key(s) remains within the computing device, with no trace of the unencrypted version(s) of the cryptographic key(s) therein.

At decision block 622 a determination is made as to whether the computing device is to go into sleep mode. If no, normal processing continues.

If however the computing device is to go into sleep mode in this fourth embodiment the driver retrieves the encrypted computing system cryptographic key(s) and the encrypted SEK from their respective storage locations and provides them to the TPM 624.

In an aspect of this fourth embodiment the encrypted version(s) of the computing system's cryptographic key(s) and the encrypted SEK are retrieved from the non-accessible memory storage, e.g., the edrive, etc., they are currently stored on, if only currently stored thereon, copied to accessible memory, e.g., RAM, etc., and thereafter provided to the TPM 624.

In this fourth embodiment the TPM decrypts the encrypted SEK with the TPM nonce 626. In this fourth embodiment the TPM decrypts the encrypted version computing system cryptographic key(s) with the decrypted generated key, e.g., SEK, 628.

In this fourth embodiment the TPM exports the decrypted version computing system cryptographic key(s) from the TPM 630.

In this fourth embodiment the TPM thereafter deletes all generated key, e.g., SEK, versions, unencrypted and encrypted, from itself 632.

Referring to FIG. 6B, in this fourth embodiment the TPM thereafter deletes all computing system cryptographic key versions, unencrypted and encrypted, from itself 640.

At decision block 642 a determination is made as to whether the computing device is to go into sleep mode. If yes, in this fourth embodiment one or more volumes of data are locked with one or more unencrypted version computing system cryptographic keys 644.

In this fourth embodiment once the respective volumes of data are locked the unencrypted, i.e., original, decrypted, computing system cryptographic key(s) is deleted, or otherwise erased or removed, from the computing device 648.

In an aspect of this fourth embodiment any encrypted version(s) of the computing system's cryptographic key(s) that is currently resident in accessible memory is deleted, or otherwise erased or removed, from accessible memory 650. In an aspect of this fourth embodiment the encrypted version(s) of the computing system's cryptographic key(s) remains stored in other than accessible memory of a volume, e.g., on the edrive, etc., where it was stored subsequent to initially being encrypted.

In this fourth embodiment at decision block 652 if the computing device is going to sleep then the computing device can now go to sleep 654.

In an embodiment at this time only encrypted versions of the cryptographic key(s) 150 and the encrypted SEK are available in the computing device 110, and thus are no use to an attacker. Without the TPM 160 and its current TPM nonce value 180, which will be altered if an attacker resets power to the TPM 160, an attacker cannot access meaningful cryptographic keys 150 to unlock protected data 140.

Thereafter the computing device awakens from sleep mode 656. In this fourth embodiment the TPM is woken up 658. Referring back to FIG. 6A, in this fourth embodiment the driver retrieves the encrypted computing system cryptographic key(s) and the encrypted SEK from their respective storage locations and provides them to the TPM 624.

In an aspect of this fourth embodiment the encrypted version(s) of the computing system's cryptographic key(s) and the encrypted SEK are retrieved from the non-accessible memory storage, e.g., the edrive, etc., they are currently stored on, if only currently stored thereon, copied to accessible memory, e.g., RAM, etc., and thereafter provided to the TPM 624.

In this fourth embodiment the TPM decrypts the encrypted SEK with the TPM nonce 626. In this fourth embodiment the TPM decrypts the encrypted version computing system cryptographic key(s) with the decrypted generated key, e.g., SEK, 628.

In this fourth embodiment the TPM exports the decrypted version computing system cryptographic key(s) from the TPM 630.

In this fourth embodiment the TPM thereafter deletes all generated key, e.g., SEK, versions, unencrypted and encrypted, from itself 632.

Referring again to FIG. 6B, in this fourth embodiment the TPM thereafter deletes all computing system cryptographic key versions, unencrypted and encrypted, from itself 640.

At decision block 642 if it is determined that the computing device is not going to sleep, i.e., it is awakening, then in this fourth embodiment one or more volumes of data are unlocked with one or more unencrypted version computing system cryptographic keys 646.

In this fourth embodiment once the respective volumes of data are unlocked the unencrypted, i.e., original, decrypted, computing system cryptographic key(s) is deleted, or otherwise erased or removed, from the computing device 648.

In an aspect of this fourth embodiment any encrypted version(s) of the computing system's cryptographic key(s) that is currently resident in accessible memory is deleted, or otherwise erased or removed, from accessible memory 650. In an aspect of this fourth embodiment the encrypted version(s) of the computing system's cryptographic key(s) remains stored in other than accessible memory of a volume, e.g., on the edrive, etc., where it was stored subsequent to initially being encrypted.

In this fourth embodiment at decision block 652 if the computing device is not going to sleep, i.e., it is awakening, then at this time the computing device has been successfully restored from sleep mode and is established for normal processing 660.

In an aspect of this fourth embodiment, once encrypted versions of the computing system's cryptographic key(s) 150 are generated and stored they need not be regenerated each time the computing device 110 subsequently goes to sleep. In this aspect of this fourth embodiment encrypted versions of the computing system's cryptographic keys 150 remain where stored when the computing device 110 is in sleep mode. In an aspect of this fourth embodiment, when the computing device 110 subsequently reawakens the encrypted version(s) of the computing system's cryptographic key(s) 150 is retrieved from its storage location, e.g., on an edrive 190, and provided to the TPM 160 in order for its decryption to be effected.

Referring again to FIG. 1, a fifth embodiment processor-based system for minimizing the time period during which cryptographic keys are maintained in accessible memory involves storing one or more of the computing system's cryptographic keys 150 in the memory, or cache, 185 of the CPU 175 of the computing device 110. This fifth embodiment can provide an alternative to the TPM-based embodiments of FIGS. 5A-5B and 6A-6B. Alternatively, this fifth embodiment can provide additional protection when used in conjunction with the TPM-based embodiments of FIGS. 5A-5B and 6A-6B, wherein encrypted and decrypted versions of cryptographic keys 150, e.g., the VMK 125 and/or the FVEK 115, and/or encrypted versions of any TPM-generated keys, when exported from the TPM 160, are stored in the CPU cache 185.

In an aspect of this fifth embodiment one or more cryptographic keys 150, e.g., the VMK 125, are maintained within the CPU cache 185 and are only temporarily stored to accessible memory 130 when needed for a processing operation. In an aspect of this fifth embodiment once the processing operation requiring one or more cryptographic keys 150 is performed the cryptographic keys 150 in accessible memory 130 are deleted there from. In an aspect of this fifth embodiment once the computing device 110 is set to go into sleep mode any cryptographic keys 150 residing in accessible memory 130 are deleted there from, prior to the computing device 110 going to sleep.

In an aspect of this fifth embodiment the cryptographic keys 150 stored in the CPU cache 185 need not be encrypted as, because, inter alia, the CPU cache 185 is inseparable from the CPU 175 and the CPU 175 does not expose external interfaces for reading this cache 185. Thus, only the code executing on the CPU 175 can access the CPU cache 185 and its contents and the difficulty of injecting malicious code for accessing the CPU cache 185 and obtaining the cryptographic keys 150 residing therein during the computing device's sleep mode is a complication that can deter a possible attacker.

A sixth embodiment portable exterior drive, e.g., USB, based system for enhancing the integrity of computing device cryptographic keys utilizes a portable exterior drive, e.g., a USB 155, to provide one or more second authentication factors when a computing device 110 resumes from sleep mode.

In this sixth embodiment a portable exterior drive, e.g., a USB 155, also referred to generically herein as a USB 155, is used when a computing device 110 resumes from sleep mode to provide one or more authentication factors for the decryption of one or more cryptographic keys 150 and/or one or more TPM-generated keys utilized in encrypting and decrypting cryptographic keys as discussed with reference to FIGS. 6A-6B herein.

As a USB 155 is not normally kept with the computing device 110, except when installed for needed information, it is less likely that the USB 155 will be lost or stolen with the computing device 110 and, thus, available for use by an attacker. Additionally, when accessing a USB 155 to obtain information the computing device 110 does not need to read data from accessible memory 130 to create and display a user interface (UI). Thus, this sixth embodiment helps to minimize the number of drivers active and executing when the computing device 110 awakens from sleep, prior to cryptographic keys becoming accessible, and thus, vulnerable to a potential attacker.

Figure 7A:
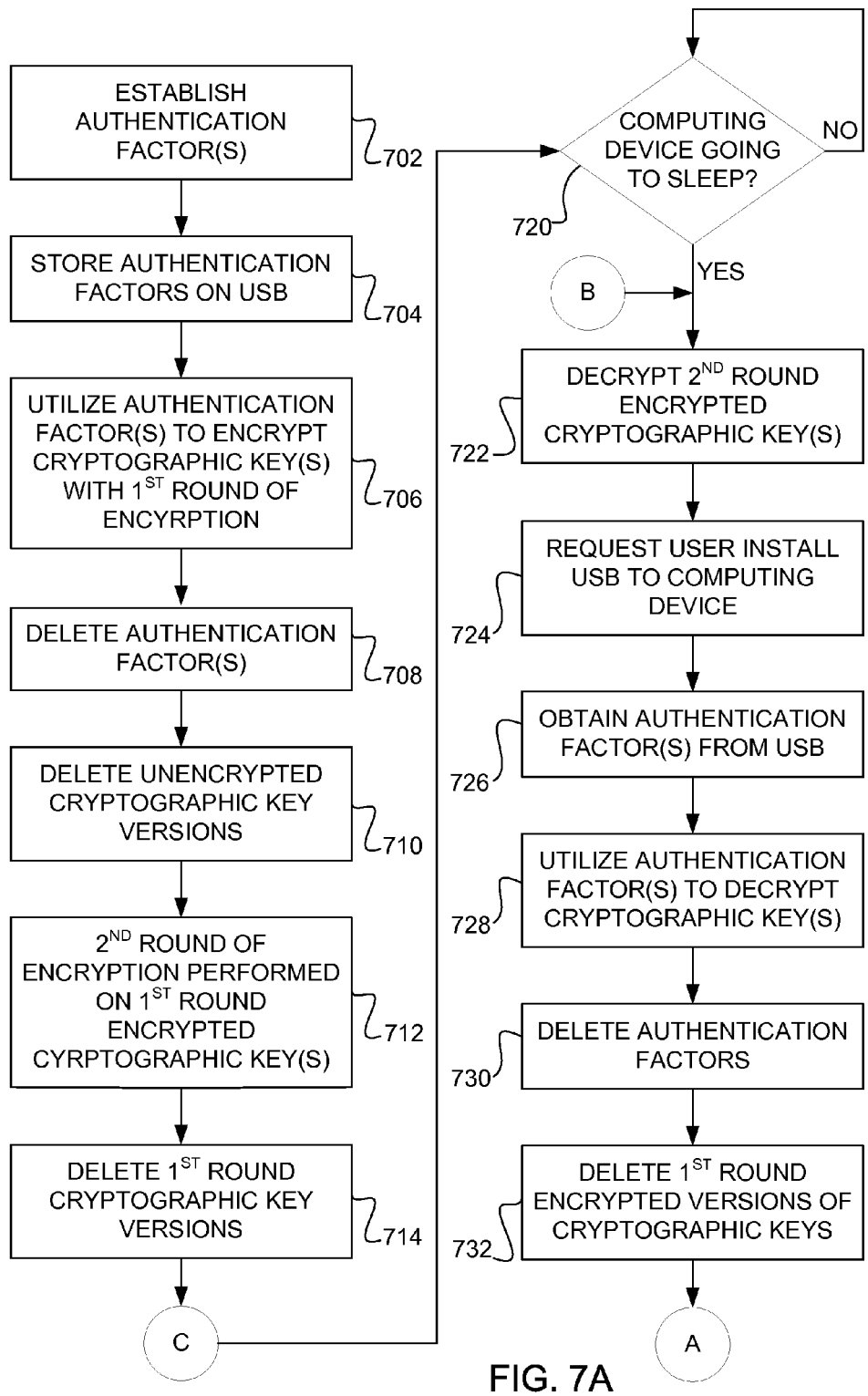
FIGS. 7A-7B depict a sixth embodiment logic flow for a method for improving data security based on the use of an external device as a source for cryptographic key encrypt/decrypt authentication information.
Figure 7B:
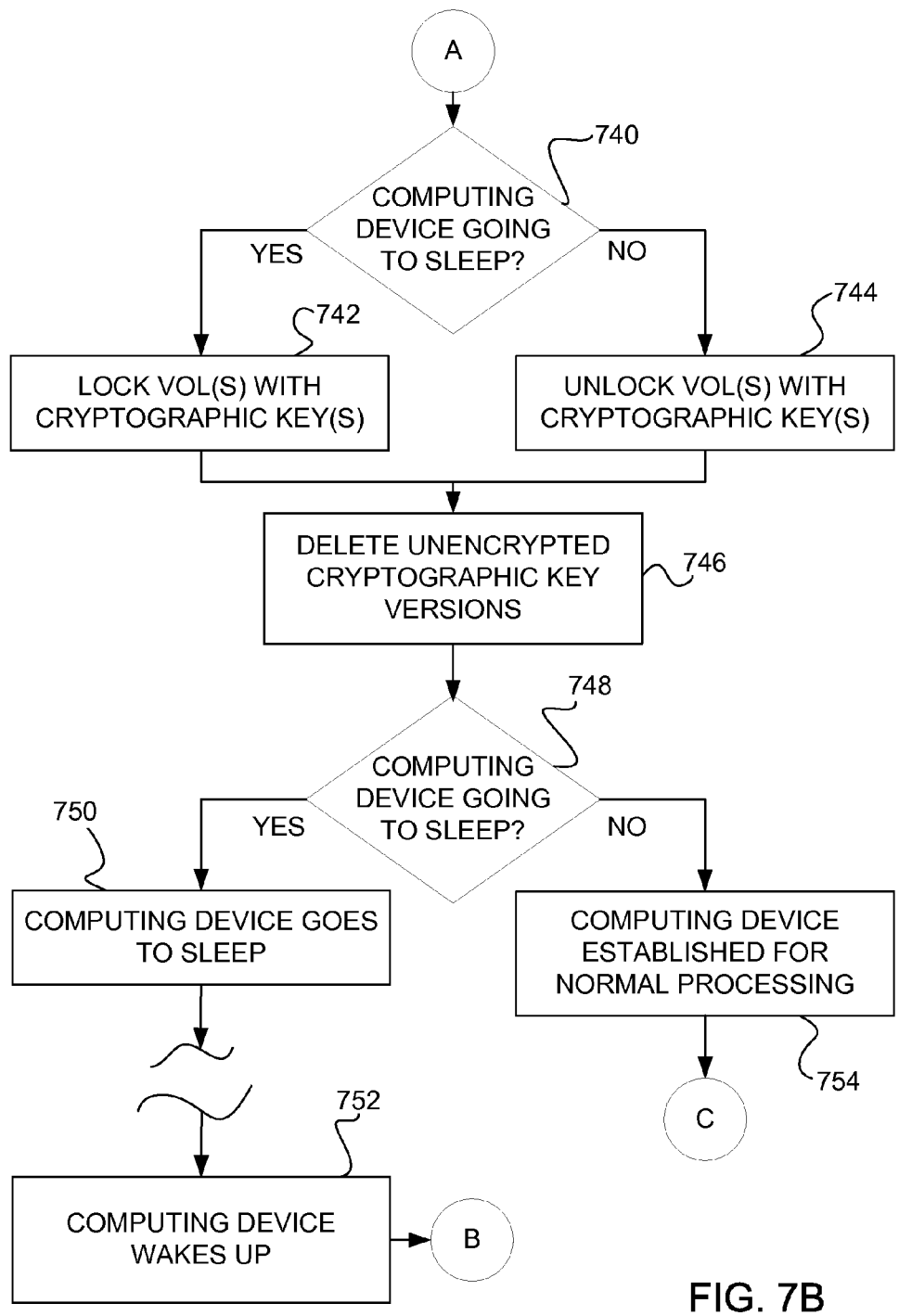

Referring to FIGS. 7A-7B, a sixth embodiment logic flow illustrates a method for improving data security when a computing device 110 resumes from sleep mode based on the use of an external device, e.g., USB 155, as a source for one or more cryptographic key encrypt/decrypt authentication information, or factors.

While the following discussion is made with respect to systems portrayed herein the operations described may be implemented in other systems. The operations described herein are not limited to the order shown. Additionally, in other alternative embodiments more or fewer operations may be performed.

Referring to FIG. 7A, in this sixth embodiment at some initial time prior to the computing device going into sleep mode, one or more authentication factors are established 702. In this sixth embodiment the established authentication factor(s) are stored on a USB connected to the computing device 704.

In this sixth embodiment the authentication factors, or a subset thereof, and/or data and/or value(s) derived there from are utilized to encrypt one or more currently existing computing system cryptographic keys with a first round, or version, of encryption 706. Subsequently, in this sixth embodiment the authentication factors and any data and/or values derived there from are deleted, or otherwise erased or removed, from the computing device 708.

In an aspect of this sixth embodiment the original, unencrypted, version(s) of the now encrypted cryptographic key(s) is deleted from the computing device during the first round encryption process 710. In an alternative aspect of this sixth embodiment the original, unencrypted, version(s) of the now encrypted cryptographic key(s) is deleted, or otherwise erased or removed, from the computing device subsequent to its first round encryption 710.

In this sixth embodiment further encryption, i.e., a second round, or version, of encryption, of one or more cryptographic keys is executed 712 as discussed inter alia with reference to FIG. 5A-5B or 6A-6B.

In an aspect of this sixth embodiment the first round encrypted version(s) of the cryptographic key(s) is deleted from the computing device during the second round of encryption 714. In an alternative aspect of this sixth embodiment the first round encrypted version(s) of the cryptographic key(s) is deleted, or otherwise erased or removed, from the computing device subsequent to its second round encryption 714.

At decision block 720 a determination is made as to whether the computing device is going to sleep. If yes, in this sixth embodiment one or more cryptographic keys and/or other generated keys, e.g., a SEK generated by the TPM, are decrypted per the established protocol(s) 722 as discussed inter alia with respect to FIG. 5A-5B or 6A-6B.

In this sixth embodiment, if not already connected to the computing device, the user is requested to install an appropriate USB, with the required authentication factors, to the computing device 724.

In this sixth embodiment a USB connected to the computing device is accessed for one or more authentication factors that will be utilized for further decryption of one or more cryptographic keys 726.

In this sixth embodiment the authentication factors obtained from the USB, or a subset thereof, and/or data and/or value(s) derived there from, are utilized to further decrypt the cryptographic key(s) 728 to obtain the original, unencrypted, cryptographic key(s) to be utilized with protected data.

In this sixth embodiment the authentication factors obtained from the USB and any data and/or values derived there from are thereafter deleted, or otherwise erased or removed, from the computing device 730.

In an aspect of this sixth embodiment the first round encrypted version(s) of the cryptographic key(s), i.e., the version of the cryptographic key(s) that has been encrypted with authentication factors and/or data and/or value(s) derived there from, is deleted from the computing device during its decryption utilizing the authentication factors 732. In an alternative aspect of this sixth embodiment the first round encrypted version(s) of the cryptographic key(s) is deleted, or otherwise erased or removed, from the computing device subsequent to its decryption utilizing the authentication factors 732.

Referring to FIG. 7B, at decision block 740 a determination is made as to whether the computing device is going to sleep. If yes, in this sixth embodiment one or more volumes of data are locked with the unencrypted cryptographic key(s) 742.

In this sixth embodiment the unencrypted version cryptographic key(s) is thereafter deleted, or otherwise erased or removed, from the computing device 746.

In this sixth embodiment at decision block 748 if the computing device is going to sleep then the computing device can now go to sleep 750.

In an embodiment at this time only encrypted versions of the cryptographic key(s) 150 are available in the computing device 110, and thus are no use to an attacker.

Thereafter the computing device awakens from sleep mode 752. Referring back to FIG. 7A, in this sixth embodiment one or more cryptographic keys and/or other generated keys, e.g., a SEK generated by the TPM, are decrypted per the established protocol(s) 722 as discussed inter alia with respect to FIG. 5A-5B or 6A-6B.

In this sixth embodiment, if not already connected to the computing device, the user is requested to install an appropriate USB, with the required authentication factors, to the computing device 724.

In this sixth embodiment a USB connected to the computing device is accessed for one or more authentication factors that will be utilized for further decryption of one or more cryptographic keys 726.

In this sixth embodiment the authentication factors obtained from the USB, or a subset thereof, and/or data and/or value(s) derived there from, are utilized to further decrypt the cryptographic key(s) 728 to obtain the original, unencrypted, cryptographic key(s) to be utilized with protected data.

In this sixth embodiment the authentication factors obtained from the USB and any data and/or values derived there from are thereafter deleted, or otherwise erased or removed, from the computing device 730.

In an aspect of this sixth embodiment the first round encrypted version(s) of the cryptographic key(s), i.e., the version of the cryptographic key(s) that has been encrypted with authentication factors and/or data and/or value(s) derived there from, is deleted from the computing device during its decryption utilizing the authentication factors 732. In an alternative aspect of this sixth embodiment the first round encrypted version(s) of the cryptographic key(s) is deleted, or otherwise erased or removed, from the computing device subsequent to its decryption utilizing the authentication factors 732.

Referring again to FIG. 7B, if at decision block 740 it is determined that the computing device is not going to sleep, i.e., it is awakening, then in this sixth embodiment one or more locked volumes of data are unlocked with the unencrypted cryptographic key(s) 744.

In this sixth embodiment the unencrypted version cryptographic key(s) is thereafter deleted, or otherwise erased or removed, from the computing device 746.

In this sixth embodiment at decision block 748 if the computing device is not going to sleep, i.e., it is awakening, then at this time the computing device has been successfully restored from its sleep mode and is established for normal processing 754.

Figure 8:
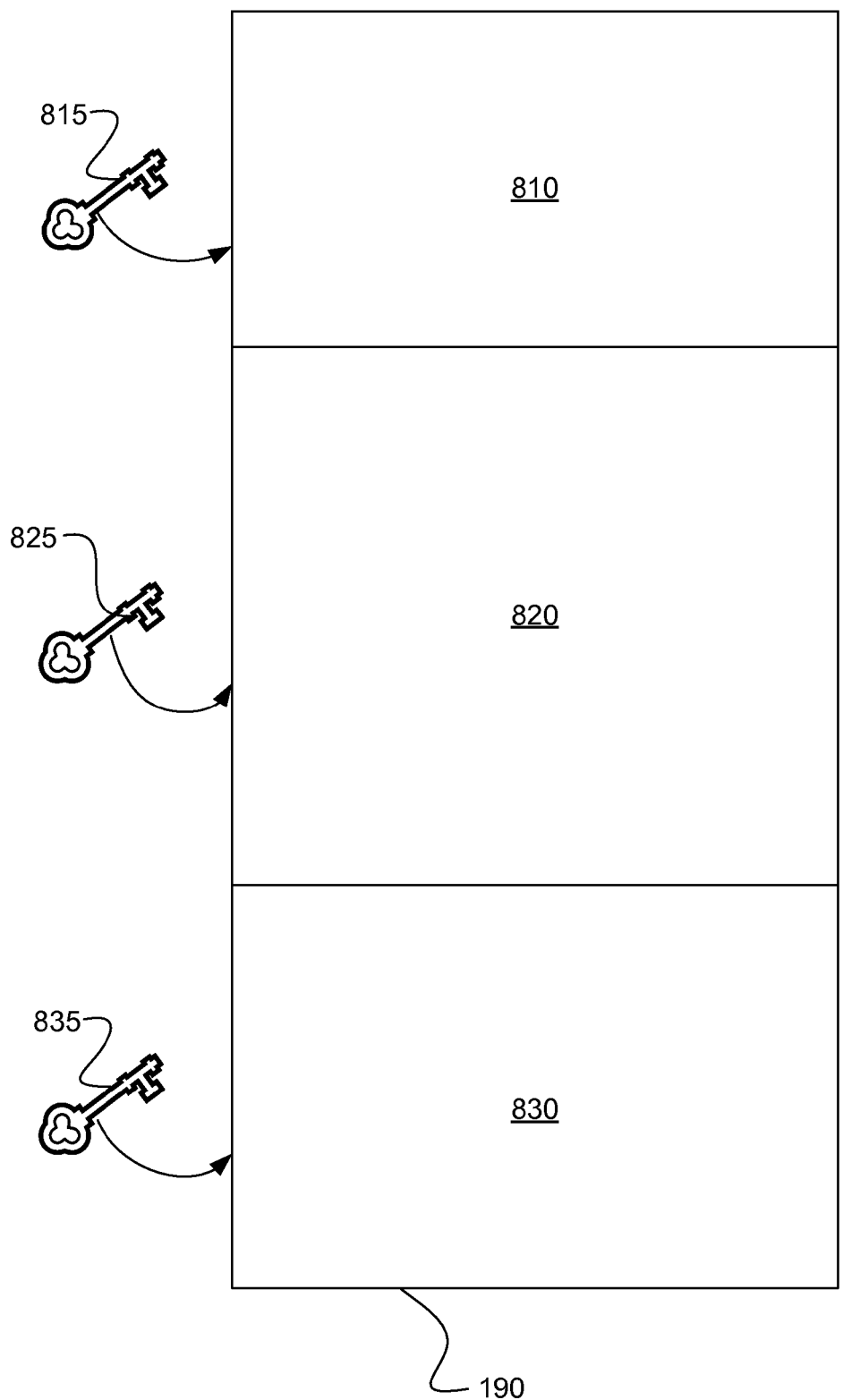
FIG. 8 depicts an edrive of an embodiment computing device upon which a seventh, data separation, embodiment for protecting data and cryptographic keys from unauthorized attacks is employed.

FIG. 8 depicts an edrive 190 of an embodiment computing device 110 upon which a seventh embodiment for protecting data 140 and cryptographic keys 150 from unauthorized attacks is employed. In this seventh embodiment an edrive 190 is configured for different logical regions. In an aspect of this seventh embodiment the edrive 190 contains at least three volumes, e.g., volume 810, volume 820 and volume 830, each with its own cryptographic key(s), e.g., cryptographic keys 815, 825 and 835 respectively. In an alternative aspect of this seventh embodiment the edrive 190 contains one volume separated into at least three bands, e.g., band 810, band 820 and band 830, wherein each band is protected by its own cryptographic key(s), e.g., cryptographic keys 815, 825 and 835 respectively.

As previously noted an edrive band is a data encrypted region in the edrive 190 and each band has its own cryptographic key, also referred to herein as a band key, e.g., a full volume encryption key (FVEK) 115, a band authentication key, also referred to herein as a band PIN, etc.

In an aspect of this seventh embodiment a first volume, or band, 810, collectively referred to herein as volume 810, or OS volume 810, contains operating system (OS) files the OS requires to boot and function. In this seventh embodiment the data stored on the OS volume 810 requires integrity, but privacy is not generally an issue as the data on this OS volume 810 contains no user-specific or secret information. In an aspect of this seventh embodiment the OS volume 810 is permanently unlocked for read operations, although it is locked and requires at least one cryptographic key, e.g., key 815, for write operations.

In an aspect of this seventh embodiment a second volume, or band, 820, collectively referred to herein as volume 820, or page file volume 820, hosts page files which contain data that is generally more sensitive than that stored on the OS volume 810, yet still includes no user-confidential information. In an aspect of this seventh embodiment the data on the page file volume 820 is only valid within the current boot cycle and is reset on a computing device 110 shut down or reboot. In an aspect of this seventh embodiment the data on the page file volume 820 is locked, i.e., becomes inaccessible without its cryptographic key(s), e.g., key 825, on computing system power resets.

In an aspect of this seventh embodiment a third volume, or band 830, collectively referred to herein as volume 830, or user data volume 830, contains protected data which includes user and application data that requires both integrity and privacy, i.e., protection from unauthorized access. In an aspect of this seventh embodiment the third, user data, volume 830 requires authentication, i.e., user input to be utilized with its cryptographic key(s), e.g., key 835, to unlock its data for both read and write operations. In an aspect of this seventh embodiment the data on the user data volume 830 is locked on computing system power resets.

In order to generate and display a UI to collect user credentials to unlock the user data volume 830 when the computing device 110 resumes from sleep mode the OS volume 810 and/or the page file volume 820 may be needed. In an aspect of this seventh embodiment the OS volume 810 is available upon the computing device 110 awakening from sleep mode as it is not locked on the computing device 110 going to sleep or a computing system 100 power reset.

In an aspect of this seventh embodiment the page file volume 820 can be unlocked following a computing device 110 awakening from sleep mode utilizing, inter alia, the second embodiment TPM-centric system and methodology for protecting cryptographic keys discussed with reference to FIGS. 4A-4B herein.

In an aspect of this seventh embodiment, once the OS volume 810 and the page file volume 820 are available, i.e., unlocked, following the computing device 110 awakening from sleep mode, a UI is generated and displayed which provides for the collection of authentication information from a valid, i.e., authorized, user 105. In an aspect of this seventh embodiment the authentication information, or factors, and/or data and/or value(s) derived there from, are used to unlock, i.e., decrypt, the cryptographic key(s), e.g., key 835, for the user data volume 835, and, subsequently, the user data volume 830, to resume normal computing device 110 processing.

Figure 9A:
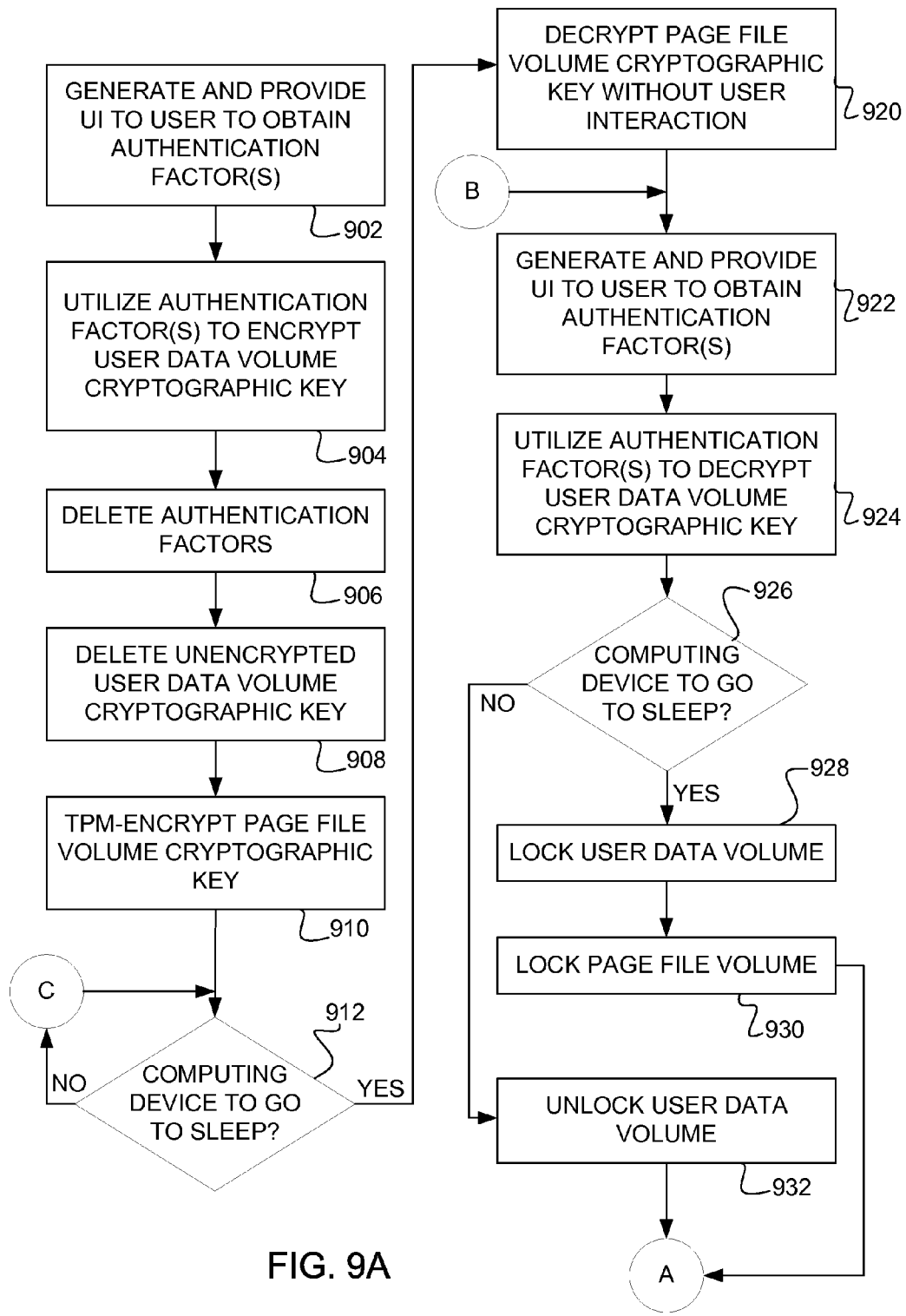
FIGS. 9A-9B depict a seventh embodiment logic flow for a method for improving computing device data security based on data separation.
Figure 9B:
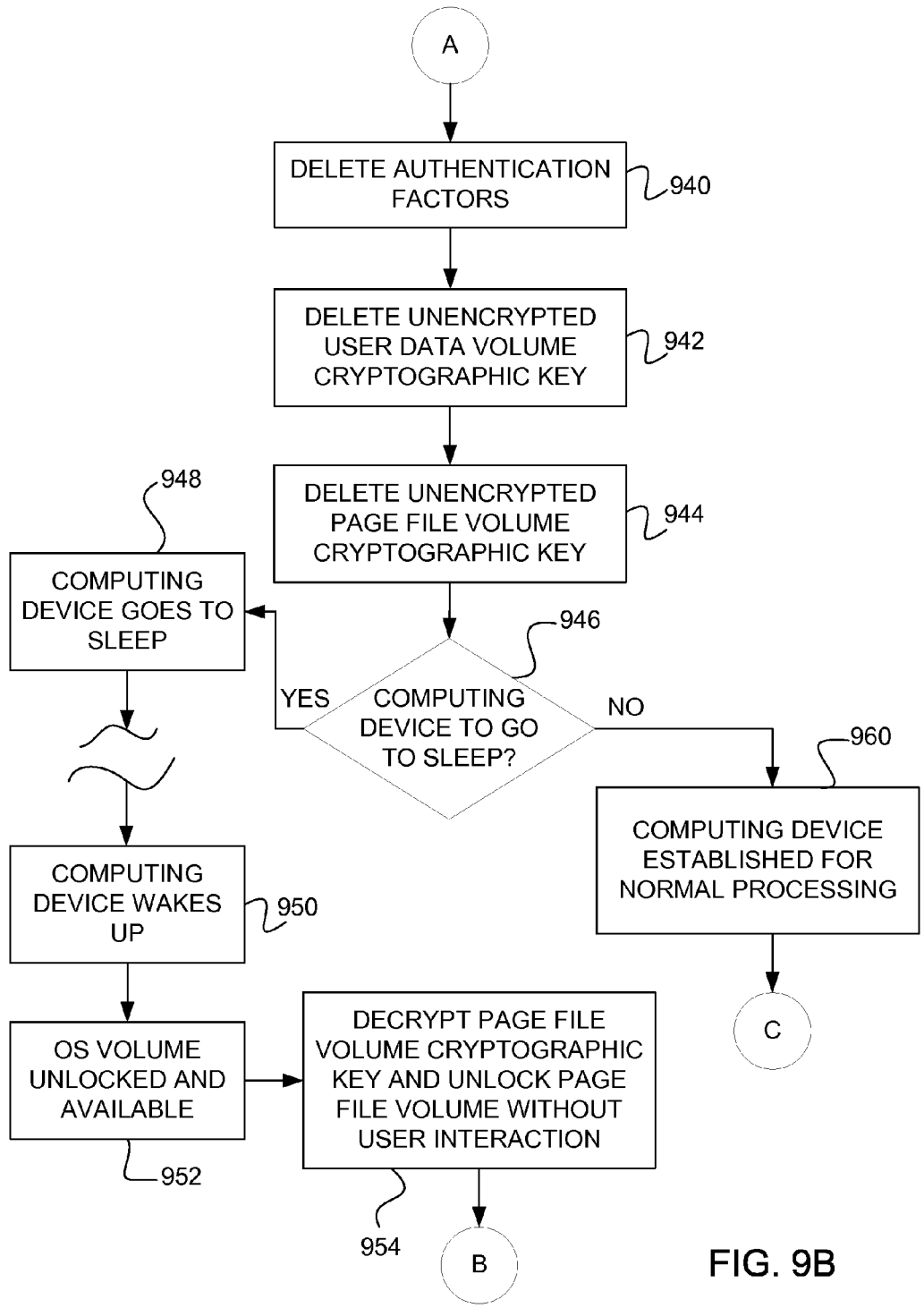

Referring to FIGS. 9A-9B, a seventh embodiment logic flow illustrates a method for improving data security when a computing device 110 resumes from sleep mode based on data separation.

While the following discussion is made with respect to systems portrayed herein the operations described may be implemented in other systems. The operations described herein are not limited to the order shown. Additionally, in other alternative embodiments more or fewer operations may be performed.

Referring to FIG. 9A, in an aspect of this seventh embodiment at some initial time prior to the computing device going into sleep mode a UI is generated and provided to the user to obtain one or more authentication factors 902, e.g., but not limited to, a password, PIN, etc. In this aspect of this seventh embodiment the authentication factors provided by the user, or a subset thereof, and/or data and/or value(s) derived there from, are utilized by a driver to encrypt one or more cryptographic keys for the user data volume, generically referred to herein as the user data volume cryptographic key, 904.

In an alternative aspect of this seventh embodiment, at some initial time prior to the computing device going into sleep mode one or more authentication factors that have previously been provided to the computing device by the user, e.g., the user's logon password, etc., or a subset thereof, and/or data and/or value(s) derived there from, are utilized by a driver to encrypt the user data volume cryptographic key 904. In this seventh embodiment the encrypted version(s) of the user data volume cryptographic key is stored within the computing system 904.

In this seventh embodiment the authentication factors and any data and/or values derived there from are subsequently deleted, or otherwise erased or removed, from the computing device 906.

In an aspect of this seventh embodiment the unencrypted version(s) of the now encrypted user data volume cryptographic key is removed from the computing device during the encryption process 908. In an alternative aspect of this seventh embodiment the unencrypted version(s) of the now encrypted user data volume cryptographic key is deleted, or otherwise erased or removed, from the computing device subsequent to its encryption 908.

In this seventh embodiment one or more cryptographic keys for the page file volume, generically referred to herein as the page file volume cryptographic key, is encrypted 910 utilizing, e.g., the TPM-centric methodology discussed herein with reference to FIGS. 4A-4B. As discussed with reference to FIGS. 4A-4B, the encrypted version(s) of the page file volume cryptographic key is stored within the computing system 910. As discussed with reference to FIGS. 4A-4B, the decrypted version(s) of the page file volume cryptographic key is deleted from the computing device during this encryption processing, or subsequent thereto, 910.

At decision block 912 a determination is made as to whether the computing device is currently preparing for sleep mode. If yes, in this seventh embodiment the encrypted page file volume cryptographic key is decrypted 920 utilizing, e.g., the TPM-centric methodology discussed herein with reference to FIGS. 4A-4B. In an aspect of this seventh embodiment the page file volume cryptographic key is decrypted without user interaction or input 920.

In this seventh embodiment a UI is generated and provided to the user to obtain one or more authentication factors for decrypting the encrypted user data volume cryptographic key 922. In this seventh embodiment the authentication factors provided by the user, or a subset thereof, and/or data and/or value(s) derived there from, are utilized by a driver to decrypt the encrypted user data volume cryptographic key 924.

At decision block 926 a determination is made as to whether the computing device is going into sleep mode. If yes, the user data volume is locked with the user data volume cryptographic key 928. In this seventh embodiment the page file volume is locked with the page file volume cryptographic key 930.

Referring to FIG. 9B, in this seventh embodiment the authentication factors and any data and/or values derived there from are subsequently deleted, or otherwise erased or removed, from the computing device 940. In this seventh embodiment the unencrypted user data volume cryptographic key is deleted, or otherwise erased or removed, from the computing device 942. In this seventh embodiment the unencrypted page file volume cryptographic key is deleted, or otherwise erased or removed, from the computing device 944.

In this seventh embodiment at decision block 946 if the computing device is going to sleep then the computing device can now go to sleep 948.

Thereafter the computing device awakens from sleep mode 950. In an aspect of this embodiment when the computing device awakens from sleep mode the OS volume is already unlocked and available for normal processing 952.

In this seventh embodiment the page file volume cryptographic key is decrypted 954 utilizing, e.g., the TPM-centric methodology discussed herein with reference to FIGS. 4A-4B, and the page file volume is unlocked and rendered available for normal processing 954. In an aspect of this seventh embodiment the page file volume cryptographic key is decrypted and the page file volume is unlocked without user interaction or input 954.

Referring again to FIG. 9A, in this seventh embodiment a UI is generated and provided to the user to obtain one or more authentication factors for decrypting the encrypted user data volume cryptographic key 922. In this seventh embodiment the authentication factors provided by the user, or a subset thereof, and/or data and/or value(s) derived there from, are utilized by a driver to decrypt the encrypted user data volume cryptographic key 924.

At decision block 926 a determination is made as to whether the computing device is going into sleep mode. If no, i.e., the computing device is awakening, then the user data volume is unlocked with the user data volume cryptographic key and rendered available for normal processing 932.

Referring again to FIG. 9B, in this seventh embodiment the authentication factors and any data and/or values derived there from are subsequently deleted, or otherwise erased or removed, from the computing device 940. In this seventh embodiment the unencrypted user data volume cryptographic key is deleted, or otherwise erased or removed, from the computing device 942. In this seventh embodiment the unencrypted page file volume cryptographic key is deleted, or otherwise erased or removed, from the computing device 944.

In this seventh embodiment at decision block 946 if the computing device is not going to sleep, i.e., it is awakening, then at this time the computing device has been successfully restored from its sleep mode and is established for normal processing 960.

Figure 10:
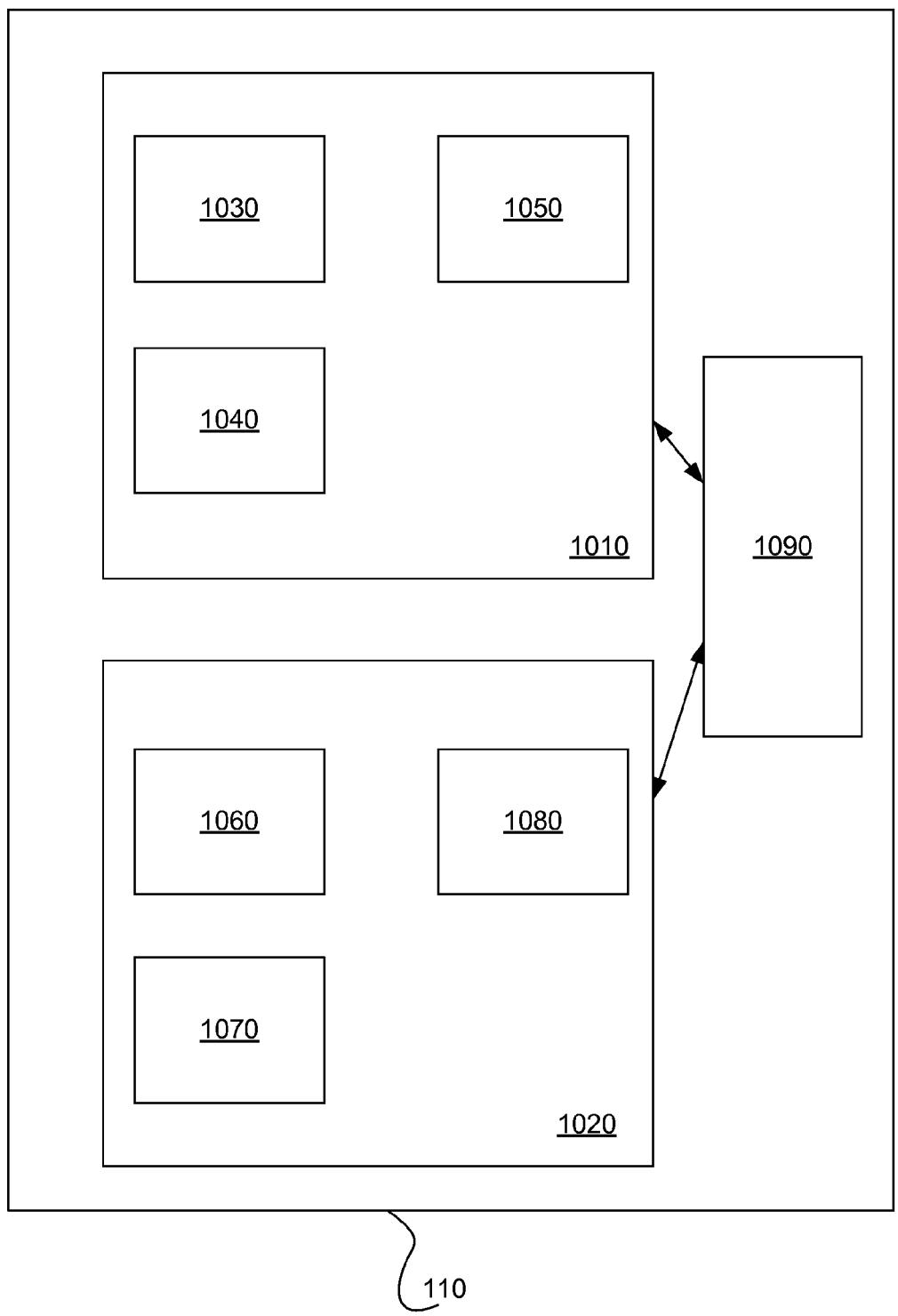
FIG. 10 depicts an embodiment computing device upon which an eighth embodiment for protecting data and cryptographic keys from unauthorized attacks is employed utilizing key management and protected data separation via virtualization.

FIG. 10 depicts an embodiment computing device 110 upon which an eighth embodiment for protecting data 140 and cryptographic keys 150 from unauthorized attacks is employed. In this eighth embodiment data and cryptographic key security is maintained by separating the key manager components from protected data by employing virtualization mechanisms. In an aspect of this eighth embodiment there are at least two operating systems (OS) executing in two compartments, both managed by a hypervisor 1090.

In an aspect of this eighth embodiment a first, host, OS 1010 has an OS volume 1030 and a page file volume 1040. In an alternative aspect of this eighth embodiment the host OS 1010 stores its OS volume contents and its page file volume contents on the same volume in the host OS 1010 in, e.g., separate bands, sections, etc. For purposes of explanation the memory where the OS volume contents are stored is referred to herein collectively as the OS volume 1030 and the memory where the page file volume contents are stored is referred to herein collectively as the page file volume 1040.

In an aspect of this eighth embodiment a second, guest, OS 1020 has a different OS volume 1060 and a different page file volume 1070. In an aspect of this eighth embodiment user data is stored on a user data volume 1080 within the guest OS 1020. In an alternative aspect of this eighth embodiment the guest OS 1020 stores its OS volume contents, its page file volume contents and its user data volume contents on the same volume in the guest OS in, e.g., separate bands, sections, etc. For purposes of explanation the memory where the OS volume contents are stored is referred to herein collectively as the OS volume 1060, the memory where the page file volume contents are stored is referred to herein collectively as the page file volume 1070, and the memory where the user data volume contents are stored is referred to herein collectively as the user data volume 1080.

In an aspect of this eighth embodiment an OS volume, whether it is the host OS volume 1030 or the guest OS volume 1060, contains operating system (OS) files the OS requires to boot and function. In this eighth embodiment the data stored on an OS volume requires integrity, but privacy is not generally an issue as the OS volume data contains no user-specific or secret information.

In an aspect of this eighth embodiment a page file volume, whether it is the host page file volume 1040 or the guest page file volume 1070, hosts page files which contain data that is generally more sensitive than that stored on an OS volume, yet still does not include user-confidential information.

In an aspect of this eighth embodiment the guest user data volume 1080 contains protected data which includes user and application data that requires both integrity and privacy, i.e., protection from unauthorized access.

In this eighth embodiment the hypervisor 1090 ensures that the guest OS 1020 does not gain access to the host OS 1010 or the host OS volumes, e.g., the OS volume 1030 and the page file volume 1040.

In this eighth embodiment a key manager 1050, i.e., one or more drivers for handling cryptographic keys, resides in the host OS 1010.

In an aspect of this eighth embodiment when the computing device 110 transitions to sleep mode the OS volume 1030 and the page file volume 1040 of the host OS 1010 are protected as described for the OS volume 810 and the page file volume 820 of the seventh embodiment described herein. In an alternative aspect of this eighth embodiment when the computing device 110 transitions to sleep mode the OS volume 1030 and the page file volume 1040 of the host OS 1010 need not be protected, i.e., locked.

In aspects of this eighth embodiment when the computing device 110 transitions to sleep mode the OS volume 1060, the page file volume 1070 and the user data volume 1080 of the guest OS 1020 are protected in one or more various ways as described herein, including the use of authentication factors input by a user to lock and/or subsequently unlock one or more of them.

In this eighth embodiment when the computing device 110 resumes from sleep mode the hypervisor 1090 and the host OS 1010 resume first, while the guest OS 1020 remains dormant, i.e., still in sleep mode. In this eighth embodiment the OS volume 1030 and the page file volume 1040 of the host OS 1010 are automatically unlocked if previously locked prior to sleep mode. As there is no user specific or secret information stored within the host OS volumes automatically unlocking the OS volume 1030 and the page file volume 1040 of the host OS 1010 upon the computing device 110 awakening from sleep mode will present no security impact. In an aspect of this eighth embodiment the OS volume 1030 and the page file volume 1040 of the host OS 1010 are unlocked, if previously locked, as described for the OS volume 810 and the page file volume 820 of the seventh embodiment described herein.

In an aspect of this eighth embodiment the key manager 1050 executing within the host OS 1010 determines what authentication factor(s), if any, to collect and the protocol(s) to utilize to unlock the guest OS volumes 1060, 1070 and 1080.

If the authentication factor(s) and implemented protocol(s) are proper the guest OS 1020 will resume from sleep mode to normal processing and at this time all storage volumes, including the user data volume 1080 of the guest OS 1020, are then accessible.

In this eighth embodiment, as the user data volume 1080 of the guest OS 1020, which contains any user-specific and/or confidential information, does not have to be unlocked for the computing device 110 to properly handle cryptographic key information, user data is protected during the key manager 1050's processing when the computing device 110 transitions from sleep mode back to normal processing.

Figure 11A:
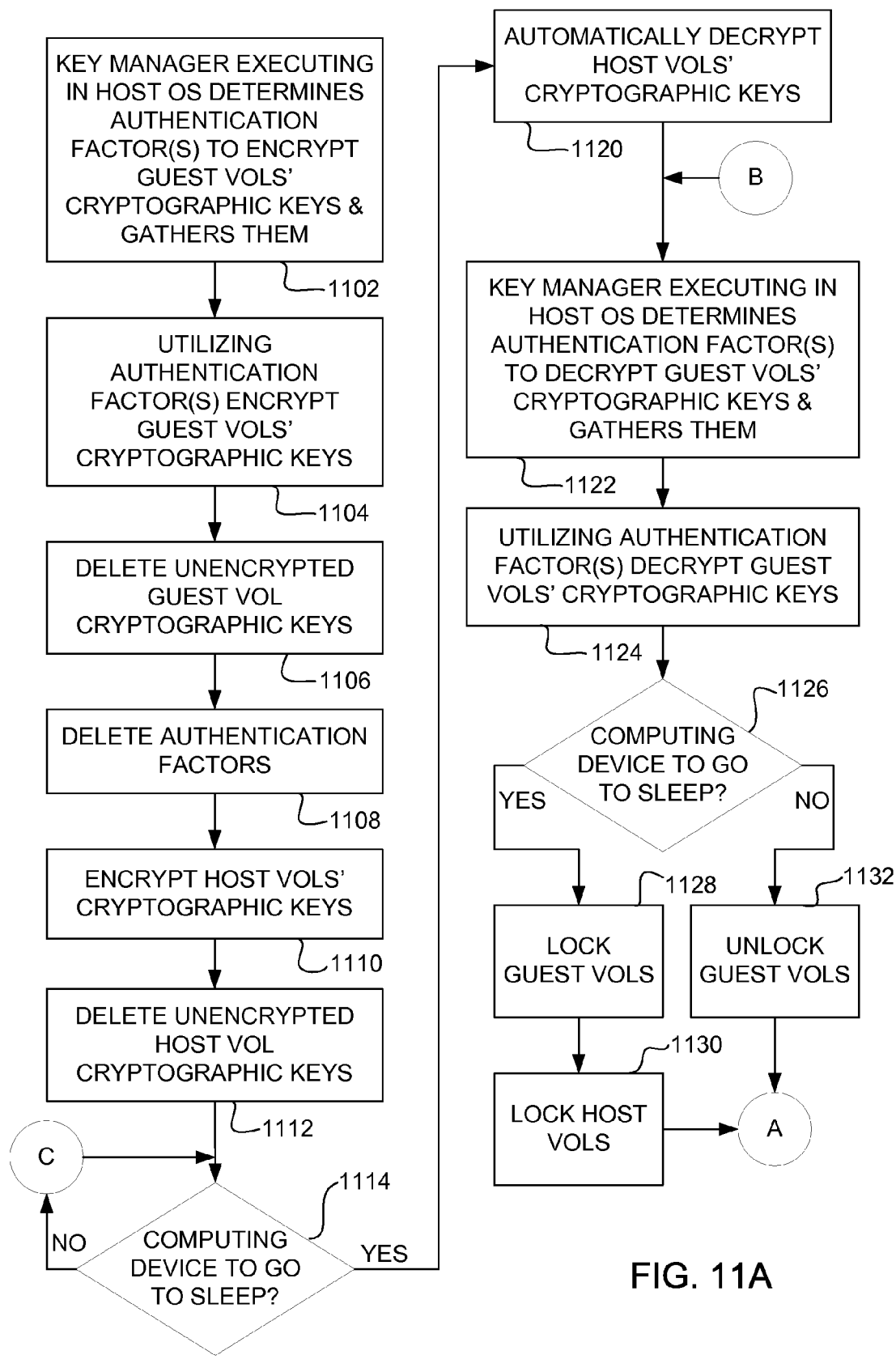
FIGS. 11A-11B depict an eighth embodiment logic flow for a method for improving computing device data security based on virtualization compartmentalization.
Figure 11B:
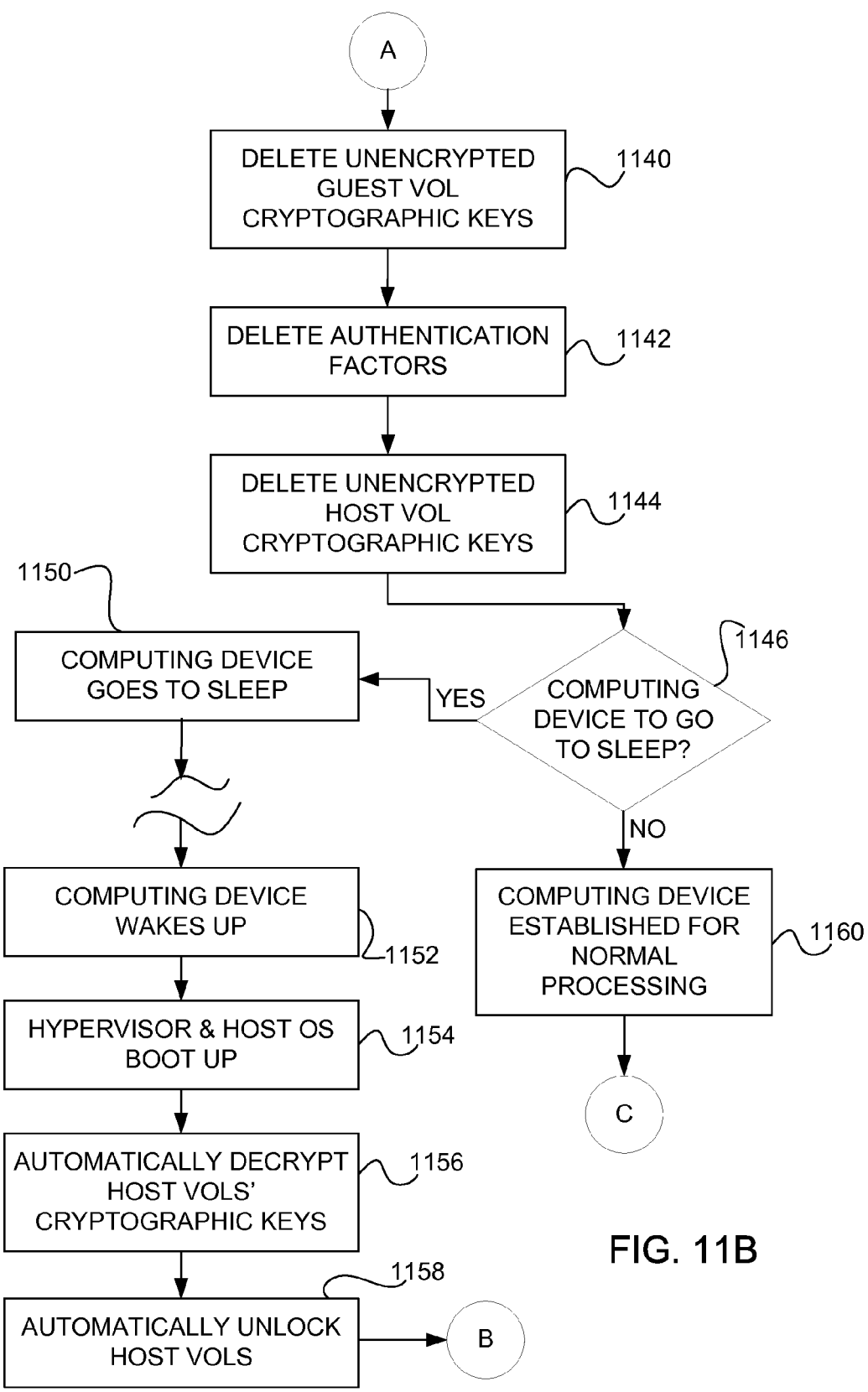

Referring to FIGS. 11A-11B, an eighth embodiment logic flow illustrates a method for improving data security when a computing device 110 resumes from sleep mode based on virtualization compartmentalization.

While the following discussion is made with respect to systems portrayed herein the operations described may be implemented in other systems. The operations described herein are not limited to the order shown. Additionally, in other alternative embodiments more or fewer operations may be performed.

Referring to FIG. 11A, at some initial time prior to the computing device transitioning to sleep mode a driver, e.g., a key manager operating in a host OS, encrypts one or more cryptographic keys for the user data volume of a guest OS 1104. In an aspect of this eighth embodiment a UI is generated and provided to the user to obtain one or more authentication factors 1102, e.g., but not limited to, a password, PIN, etc. In this aspect of this eighth embodiment the authentication factors provided by the user, or a subset thereof, and/or data and/or value(s) derived there from, are utilized by the driver to encrypt one or more cryptographic keys for the user data volume of the guest OS, generically referred to herein as the guest OS user data volume cryptographic key, 1104.

In an alternative aspect of this eighth embodiment, at some initial time prior to the computing device transitioning to sleep mode one or more authentication factors that have previously been provided to the computing device by the user, e.g., the user's logon password, etc., or a subset thereof, and/or data and/or value(s) derived there from, are utilized by the driver to encrypt the guest OS user data volume cryptographic key 1104.

In this eighth embodiment the encrypted version(s) of the guest OS user data volume cryptographic key is stored within the computing system 1104.

In an aspect of this eighth embodiment the unencrypted version(s) of the now encrypted guest OS user data volume cryptographic key is removed from the computing device during the encryption process 1106. In an alternative aspect of this eighth embodiment the unencrypted version(s) of the now encrypted guest OS user data volume cryptographic key is deleted, or otherwise erased or removed, from the computing device subsequent to its encryption 1106.

In an aspect of this eighth embodiment the driver encrypts one or more cryptographic keys for the page file volume of the guest OS, generically referred to herein as the guest OS page file volume cryptographic key, 1104. In an aspect of this eighth embodiment the gathered authentication factors, or a subset thereof, and/or data and/or value(s) derived there from, are utilized by the driver to encrypt the guest OS page file volume cryptographic key 1104. In other aspects of this eighth embodiment other embodiments discussed herein, e.g., the TPM-based second embodiment of FIGS. 4A-4B, is utilized to encrypt the guest OS page file volume cryptographic key 1104.

In an aspect of this eighth embodiment the encrypted version(s) of the guest OS page file volume cryptographic key is stored within the computing system 1104.

In an aspect of this eighth embodiment the unencrypted version(s) of the now encrypted guest OS page file volume cryptographic key is removed from the computing device during the encryption process 1106. In an alternative aspect of this eighth embodiment the unencrypted version(s) of the now encrypted guest OS page file volume cryptographic key is deleted, or otherwise erased or removed, from the computing device subsequent to its encryption 1106.

In an aspect of this eighth embodiment the driver encrypts one or more cryptographic keys for the OS volume of the guest OS, generically referred to herein as the guest OS OS volume cryptographic key, 1104. In an aspect of this eighth embodiment the gathered authentication factors, or a subset thereof, and/or data and/or value(s) derived there from, are utilized by the driver to encrypt the guest OS OS volume cryptographic key 1104. In other aspects of this eighth embodiment other embodiments discussed herein, e.g., the TPM-based second embodiment of FIGS. 4A-4B, is utilized to encrypt the guest OS OS volume cryptographic key 1104.

In an aspect of this eighth embodiment the encrypted version(s) of the guest OS OS volume cryptographic key is stored within the computing system 1104.

In an aspect of this eighth embodiment the unencrypted version(s) of the now encrypted guest OS OS volume cryptographic key is removed from the computing device during the encryption process 1106. In an alternative aspect of this eighth embodiment the unencrypted version(s) of the now encrypted guest OS OS volume cryptographic key is deleted, or otherwise erased or removed, from the computing device subsequent to its encryption 1106.

In this eighth embodiment, if the authentication factors do not need to be used for any encryption of any host OS cryptographic keys the authentication factors obtained and any data and/or values derived there from are deleted, or otherwise erased or removed, from the computing device 1108.

In an aspect of this eighth embodiment the driver encrypts one or more cryptographic keys for the page file volume of the host OS, generically referred to herein as the host OS page file volume cryptographic key, 1110.

In an aspect of this eighth embodiment the gathered authentication factors, or a subset thereof, and/or data and/or value(s) derived there from, are utilized by the driver to encrypt the host OS page file volume cryptographic key 1110. In other aspects of this eighth embodiment other embodiments discussed herein, e.g., the TPM-based second embodiment of FIGS. 4A-4B, is utilized to encrypt the host OS page file volume cryptographic key 1110.

In an aspect of this eighth embodiment the encrypted version(s) of the host OS page file volume cryptographic key is stored within the computing system 1110.

In an aspect of this eighth embodiment the unencrypted version(s) of the now encrypted host OS page file volume cryptographic key is removed from the computing device during the encryption process 1112. In an alternative aspect of this eighth embodiment the unencrypted version(s) of the now encrypted host OS page file volume cryptographic key is deleted, or otherwise erased or removed, from the computing device subsequent to its encryption 1112.

In this eighth embodiment, if one or more authentication factors are used for any encryption of any host OS cryptographic keys the obtained authentication factors and any data and/or values derived there from are subsequently deleted, or otherwise erased or removed, from the computing device 1108.

At decision block 1114 a determination is made as to whether the computing device is going to sleep. If yes, in this eighth embodiment the host OS cryptographic keys that were previously encrypted are automatically decrypted utilizing the corresponding methodology employed to encrypt them 1120.

In this eighth embodiment a driver, e.g., a key manager operating in the host OS, decrypts the prior encrypted guest OS cryptographic keys 1124.

In this eighth embodiment a UI is generated and provided to the user to obtain one or more authentication factors 1122. In this eighth embodiment the authentication factors provided by the user, or a subset thereof, and/or data and/or value(s) derived there from, are utilized by the driver to decrypt the guest OS cryptographic keys 1124.

At decision block 1126 a determination is made as to whether the computing device is transitioning to sleep mode. If yes, in this eighth embodiment the now unencrypted guest OS user data volume cryptographic key is used to lock the guest OS user data volume 1128. In an aspect of this eighth embodiment the unencrypted guest OS page file volume cryptographic key is used to lock the guest OS page file volume 1128. In an aspect of this eighth embodiment the unencrypted guest OS OS volume cryptographic key is used to lock the guest OS OS volume 1128.

In an aspect of this eighth embodiment one or more volumes of the host OS are automatically locked with their respective unencrypted host OS cryptographic keys 1130.

Referring to FIG. 11B, in this eighth embodiment the unencrypted guest OS cryptographic keys for which an encrypted version was previously created are deleted, or otherwise erased or removed, from the computing device 1140.

In this eighth embodiment the authentication factors obtained and any data and/or values derived there from are deleted, or otherwise erased or removed, from the computing device 1142.

In this eighth embodiment the unencrypted host OS cryptographic keys for which an encrypted version was previously created are deleted, or otherwise erased or removed, from the computing device 1144.

In this eighth embodiment at decision block 1146 if the computing device is going to sleep then the computing device can now go to sleep 1150.

Thereafter the computing device awakens from sleep mode 1152. In this eighth embodiment the hypervisor and the host OS boot up to resume normal processing operations 1154.

In this eighth embodiment the host OS cryptographic keys that were previously encrypted are automatically decrypted utilizing the corresponding methodology employed to encrypt them 1156. In this eighth embodiment the locked OS volumes are then unlocked with their respective unencrypted host OS cryptographic keys 1158.

Referring again to FIG. 11A, in this eighth embodiment a UI is generated and provided to the user to obtain one or more authentication factors 1122. In this eighth embodiment the authentication factors provided by the user, or a subset thereof, and/or data and/or value(s) derived there from, are utilized by the driver to decrypt the guest OS cryptographic keys 1124.

At decision block 1126 a determination is made as to whether the computing device is transitioning to sleep mode. If no, i.e., the computing device is awakening, in this eighth embodiment the now unencrypted guest OS cryptographic keys are used to unlock their respective guest OS volumes 1132.

Referring again to FIG. 11B, in this eighth embodiment the unencrypted guest OS cryptographic keys for which an encrypted version was previously created are deleted, or otherwise erased or removed, from the computing device 1140.

In this eighth embodiment the authentication factors obtained and any data and/or values derived there from are deleted, or otherwise erased or removed, from the computing device 1142.

In this eighth embodiment the unencrypted host OS cryptographic keys for which an encrypted version was previously created are deleted, or otherwise erased or removed, from the computing device 1144.

In this eighth embodiment at decision block 1146 if the computing device is not going to sleep, i.e., it is awakening, then the computing device has been successfully restored from its sleep mode and is established for normal processing 1160.

In various other embodiments alternative combinations of security mechanisms described herein and/or alternative combinations that incorporate security mechanisms described herein can be employed to protect a computing device 110.

Computing Device Configuration

Figure 12:
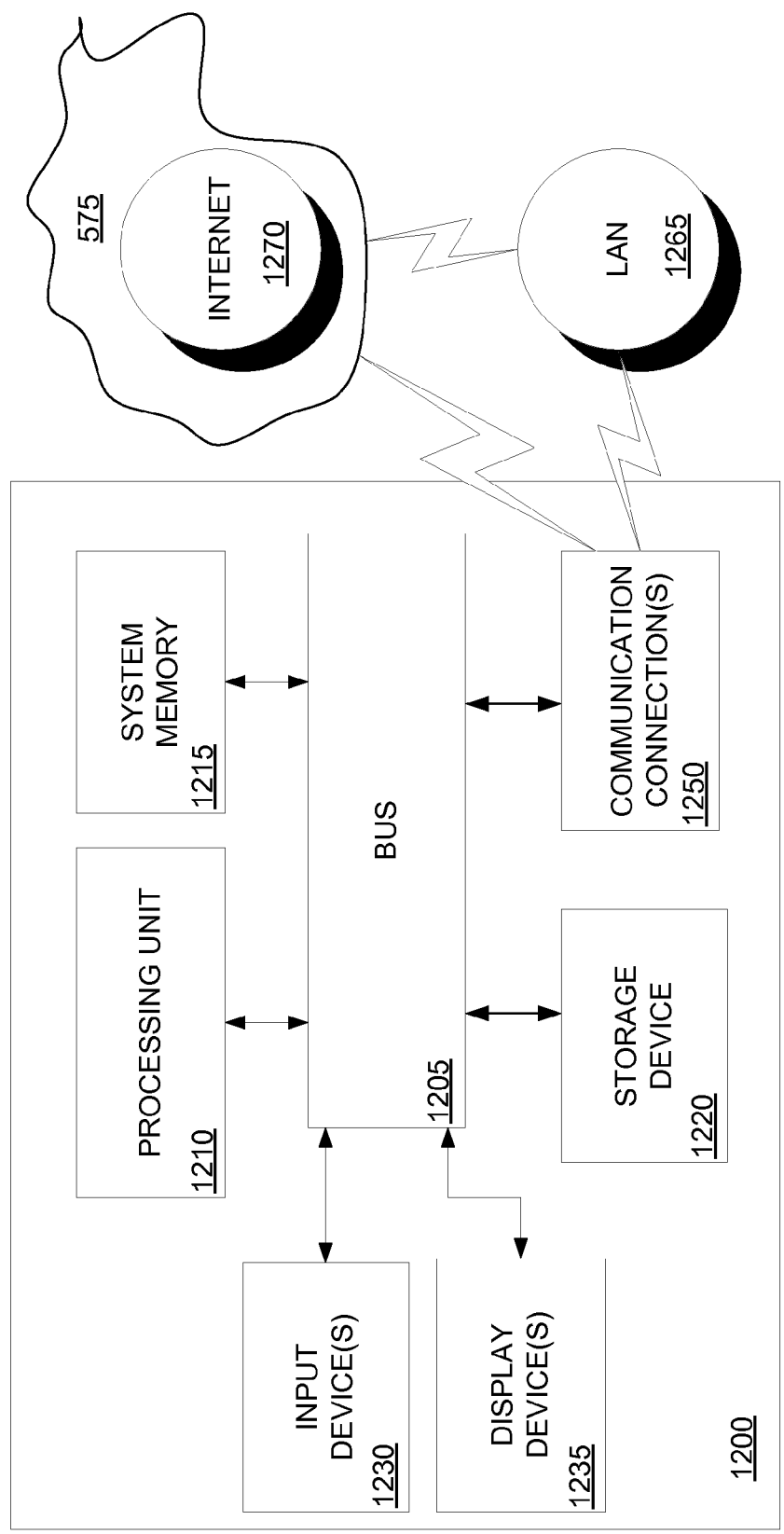
FIG. 12 is a block diagram of an exemplary basic computing device with the capability to process software, i.e., program code, or instructions.

FIG. 12 is a block diagram that illustrates an exemplary computing device 1200 upon which an embodiment can be implemented. Examples of computing devices 1200 include, but are not limited to, computers, e.g., desktop computers, computer laptops, also referred to herein as laptops, notebooks, etc.; smart phones; camera phones; cameras with internet communication and processing capabilities; etc.

The embodiment computing device 1200 includes a bus 1205 or other mechanism for communicating information, and a processing unit 1210, also referred to herein as a processor 1210, coupled with the bus 1205 for processing information. The computing device 1200 also includes system memory 1215, which may be volatile or dynamic, such as random access memory (RAM), non-volatile or static, such as read-only memory (ROM) or flash memory, or some combination of the two. The system memory 1215 is coupled to the bus 1205 for storing information and instructions to be executed by the processor 1210, and may also be used for storing temporary variables or other intermediate information during the execution of instructions by the processor 1210. The system memory 1215 often contains an operating system and one or more programs, or applications, and/or software code, and may also include program data.

In an embodiment a storage device 1220, such as a magnetic or optical disk, is also coupled to the bus 1205 for storing information, including program code of instructions and/or data. In an embodiment computing device 1200 the storage device 1220 is computer readable storage, or machine readable storage, 1220.

Embodiment computing devices 1200 generally include one or more display devices 1235, such as, but not limited to, a display screen, e.g., a cathode ray tube (CRT) or liquid crystal display (LCD), a printer, and one or more speakers, for providing information to a computing device user. Embodiment computing devices 1200 also generally include one or more input devices 1230, such as, but not limited to, a keyboard, mouse, trackball, pen, voice input device(s), and touch input devices, which a user can utilize to communicate information and command selections to the processor 1210. All of these devices are known in the art and need not be discussed at length here.

The processor 1210 executes one or more sequences of one or more programs, or applications, and/or software code instructions contained in the system memory 1215. These instructions may be read into the system memory 1215 from another computing device-readable medium, including, but not limited to, the storage device 1220. In alternative embodiments, hard-wired circuitry may be used in place of or in combination with software instructions. Embodiment computing device 1200 environments are not limited to any specific combination of hardware circuitry and/or software.

The term "computing device-readable medium" as used herein refers to any medium that can participate in providing program, or application, and/or software instructions to the processor 1210 for execution. Such a medium may take many forms, including but not limited to, storage media and transmission media. Examples of storage media include, but are not limited to, RAM, ROM, EEPROM, flash memory, CD-ROM, digital versatile disks (DVD), magnetic cassettes, magnetic tape, magnetic disk storage, or any other magnetic medium, floppy disks, flexible disks, punch cards, paper tape, or any other physical medium with patterns of holes, memory chip, or cartridge. The system memory 1215 and storage device 1220 of embodiment computing devices 1200 are further examples of storage media. Examples of transmission media include, but are not limited to, wired media such as coaxial cable(s), copper wire and optical fiber, and wireless media such as optic signals, acoustic signals, RF signals and infrared signals.

An embodiment computing device 1200 also includes one or more communication connections 1250 coupled to the bus 1205. Embodiment communication connection(s) 1250 provide a two-way data communication coupling from the computing device 1200 to other computing devices on a local area network (LAN) 1265 and/or wide area network (WAN), including the world wide web, or internet 1270. Examples of the communication connection(s) 1250 include, but are not limited to, an integrated services digital network (ISDN) card, modem, LAN card, and any device capable of sending and receiving electrical, electromagnetic, optical, acoustic, RF or infrared signals.

Communications received by an embodiment computing device 1200 can include program, or application, and/or software instructions and data. Instructions received by the embodiment computing device 1200 may be executed by the processor 1210 as they are received, and/or stored in the storage device 1220 or other non-volatile storage for later execution.

CONCLUSION

While various embodiments are described herein, these embodiments have been presented by way of example only and are not intended to limit the scope of the claimed subject matter. Many variations are possible which remain within the scope of the following claims. Such variations are clear after inspection of the specification, drawings and claims herein. Accordingly, the breadth and scope of the claimed subject matter is not to be restricted except as defined with the following claims and their equivalents.

What is claimed is:

1. A TPM-centric method for computing device attack mitigation, wherein the computing device comprises a TPM (Trusted Platform Module) and at least one volume, the method comprising:
   utilizing the TPM of the computing device to generate a cryptographic key comprising an original version TPM-generated cryptographic key;
   providing an original version second cryptographic key to the TPM of the computing device, wherein the original version second cryptographic key is a prior established computing device cryptographic key;
   utilizing the TPM of the computing device to encrypt the original version second cryptographic key with the original version TPM-generated cryptographic key to generate an encrypted version second cryptographic key;
   utilizing the TPM of the computing device to encrypt the original version TPM-generated cryptographic key to generate an encrypted version TPM-generated cryptographic key;
   storing the encrypted version TPM-generated cryptographic key outside the TPM;
   storing the encrypted version second cryptographic key outside the TPM;
   deleting the original version TPM-generated cryptographic key from the computing device subsequent to encrypting the original version TPM-generated cryptographic key;
   deleting the original version second cryptographic key from the computing device subsequent to encrypting the original version second cryptographic key;
   retrieving the encrypted version TPM-generated cryptographic key from its storage location upon the computing device preparing to go into sleep mode;
   providing the encrypted version TPM-generated cryptographic key to the TPM of the computing device upon the computing device preparing to go into sleep mode;
   retrieving the encrypted version second cryptographic key from its storage location upon the computing device preparing to go into sleep mode;
   providing the encrypted version second cryptographic key to the TPM of the computing device upon the computing device preparing to go into sleep mode;

utilizing the TPM of the computing device to decrypt the encrypted version TPM-generated cryptographic key to regenerate the original version TPM-generated cryptographic key upon the computing device preparing to go into sleep mode;

utilizing the TPM of the computing device to decrypt the encrypted version second cryptographic key with the original version TPM-generated cryptographic key to regenerate the original version second cryptographic key upon the computing device preparing to go into sleep mode;

utilizing the original version second cryptographic key to lock a volume of the computing device prior to the computing device going into sleep mode;

deleting the original version second cryptographic key from the computing device subsequent to utilizing the original version second cryptographic key to lock a volume of the computing device and prior to the computing device going into sleep mode; and deleting the original version TPM-generated cryptographic key from the computing device subsequent to utilizing the original version TPM-generated cryptographic key to decrypt the encrypted version second cryptographic key and prior to the computing device going into sleep mode.

2. The TPM-centric method for computing device attack mitigation of claim 1, further comprising:

allowing the computing device to go into sleep mode;

awakening the TPM of the computing device upon the computing device awakening from sleep mode;

utilizing the TPM of the computing device to decrypt the encrypted version TPM-generated cryptographic key to regenerate the original version TPM-generated cryptographic key upon the computing device awakening from sleep mode;

utilizing the TPM of the computing device to decrypt the encrypted version second cryptographic key with the original version TPM-generated cryptographic key to regenerate the original version second cryptographic key upon the computing device awakening from sleep mode; and utilizing the original version second cryptographic key to unlock a volume of the computing device.

3. The TPM-centric method for computing device attack mitigation of claim 2, further comprising deleting the original version second cryptographic key from the computing device subsequent to utilizing the original version second cryptographic key to unlock a volume of the computing device.

4. The TPM-centric method for computing device attack mitigation of claim 2, further comprising:

utilizing the TPM of the computing device to generate a nonce; and utilizing the TPM of the computing device to decrypt the encrypted version TPM-generated cryptographic key with the nonce to regenerate the original version TPM-generated cryptographic key.

5. The TPM-centric method for computing device attack mitigation of claim 1, further comprising:

utilizing the TPM of the computing device to generate a nonce; and utilizing the TPM of the computing device to encrypt the original version TPM-generated cryptographic key with the nonce to generate the encrypted version TPM-generated cryptographic key.

6. The TPM-centric method for computing device attack mitigation of claim 1, further comprising deleting the encrypted version second cryptographic key from the TPM of the computing device prior to the computing device going into sleep mode.

7. The TPM-centric method for computing device attack mitigation of claim 1, further comprising deleting the encrypted version TPM-generated cryptographic key from the TPM of the computing device prior the computing device going into sleep mode.

8. The TPM-centric method for computing device attack mitigation of claim 1, wherein the original version TPM-generated cryptographic key comprises a symmetric encryption key.

9. The TPM-centric method for computing device attack mitigation of claim 1, wherein the computing device comprises a CPU and CPU memory, the method further comprising:

utilizing the TPM of the computing device to export the encrypted version TPM generated cryptographic key from the TPM; and storing the encrypted version TPM-generated cryptographic key exported from the TPM in CPU memory.

10. A method for defending against unwarranted attacks to a computing device, wherein the computing device comprises at least one volume, the method comprising:

generating a cryptographic key comprising an original version first cryptographic key;

utilizing the original version first cryptographic key to encrypt a second cryptographic key in existence within the computing device wherein the resultant encrypted key comprises an encrypted version second cryptographic key;

deleting the original version first cryptographic key from the computing device subsequent to encrypting the second cryptographic key in existence within the computing device;

storing the encrypted version second cryptographic key subsequent to encrypting the second cryptographic key;

retrieving the encrypted version second cryptographic key from its storage location upon the computing device preparing to go into sleep mode;

generating the original version first cryptographic key upon the computing device preparing to go into sleep mode;

utilizing the original version first cryptographic key to decrypt the encrypted version second cryptographic key upon the computing device preparing to go into sleep mode;

utilizing the second cryptographic key to lock a volume of the computing device prior to the computing device going into sleep mode;

deleting the second cryptographic key from the computing device subsequent to utilizing the second cryptographic key to lock a volume of the computing device and prior to the computing device going into sleep mode;

allowing the computing device to go into sleep mode wherein the second cryptographic key is not stored upon the computing device at the time the computing device goes into sleep mode;

regenerating the cryptographic key comprising the original version first cryptographic key subsequent to the computing device awakening from sleep mode;

decrypting the encrypted version second cryptographic key to regenerate the second cryptographic key subsequent to the computing device awakening from sleep mode; and utilizing the second cryptographic key to unlock a volume of the computing device subsequent to the computing device awakening from sleep mode.

11. The method for defending against unwarranted attacks to a computing device of claim 10, wherein the computing device comprises a TPM, the method further comprising:
utilizing the TPM of the computing device to generate a nonce;
accessing the TPM of the computing device to retrieve the nonce generated by the TPM of the computing device;
utilizing the nonce to generate the cryptographic key comprising the original version first cryptographic key; and
utilizing the nonce to regenerate the cryptographic key comprising the original version first cryptographic key subsequent to the computing device awakening from sleep mode.

12. The method for defending against unwarranted attacks to a computing device of claim 11, wherein the original version first cryptographic key is a symmetric encryption key.

13. The method for defending against unwarranted attacks to a computing device of claim 10, further comprising deleting the original version first cryptographic key from the computing device subsequent to utilizing the original version first cryptographic key to decrypt the encrypted version second cryptographic key and prior to the computing device going into sleep mode.

14. The method for defending against unwarranted attacks to a computing device of claim 10, further comprising:
utilizing the original version first cryptographic key to decrypt the encrypted version second cryptographic key subsequent to the computing device awakening from sleep mode; and
deleting the original version first cryptographic key from the computing device subsequent to utilizing the original version first cryptographic key to decrypt the encrypted version second cryptographic key upon the computing device awakening from sleep mode.

15. A computing device comprising the capability to mitigate attacks to user information stored thereon, the computing device comprising:
at least one volume;
at least one operating system operating thereon;
at least one computing device cryptographic key for assisting in maintaining security of user information;
computing device accessible memory;
a TPM (Trusted Platform Module);
a USB (Universal Serial Bus) port;
at least one instruction for generating a user interface to request a user of the computing device to install a USB to the USB port;
at least one instruction for obtaining a first authentication factor from the USB installed in the USB port;
at least one instruction for utilizing the first authentication factor to encrypt a first computing device cryptographic key with a first round of encryption wherein the resultant encrypted key is an initial round encrypted first computing device cryptographic key;
at least one instruction for generating a second cryptographic key;
at least one instruction for utilizing the second cryptographic key to encrypt the initial round encrypted first computing device cryptographic key with a second round of encryption wherein the resultant encrypted key is an encrypted version first computing device cryptographic key;
at least one instruction for removing the first computing device cryptographic key from the computing device upon the computing device preparing for sleep mode;
at least one instruction for removing the second cryptographic key from the computing device upon the computing device preparing for sleep mode;
at least one instruction for obtaining a second authentication factor from the USB installed in the USB port upon the computing device awakening from sleep mode;
at least one instruction for utilizing the second cryptographic key to perform a first round of decryption subsequent to the computing device awakening from sleep mode on the encrypted version first computing device cryptographic key wherein the resultant encrypted key is the initial round encrypted first computing device cryptographic key;
at least one instruction for utilizing the second authentication factor to perform a second round of decryption subsequent to the computing device awakening from sleep mode on the initial round encrypted first computing device cryptographic key wherein the resultant key is the first computing device cryptographic key; and
at least one instruction for utilizing the first computing device cryptographic key to unlock a volume of the computing device subsequent to the computing device awakening from sleep mode.

16. The computing device of claim 15, wherein the first authentication factor and the second authentication factor comprise the same authentication factor.

17. The computing device of claim 15, further comprising:
the TPM comprising the capability to generate a nonce;
at least one instruction for utilizing the TPM to generate the second cryptographic key on the TPM;
at least one instruction for utilizing the TPM to encrypt the second cryptographic key with the TPM nonce to generate an encrypted version second cryptographic key on the TPM;
at least one instruction for providing the TPM the first computing device cryptographic key;
at least one instruction for utilizing the TPM to utilize the encrypted version second cryptographic key to encrypt the first computing device cryptographic key on the TPM to generate the encrypted version first computing device cryptographic key;
at least one instruction for storing the encrypted version second cryptographic key outside the TPM prior to the computing device going into sleep mode; and
at least one instruction for storing the encrypted version first computing device cryptographic key outside the TPM prior to the computing device going into sleep mode.

* * * * *